United States Patent [19]

Shin et al.

[11] Patent Number: 5,835,917

[45] Date of Patent: Nov. 10, 1998

[54] TABLE FORMING APPARATUS EMPLOYING A PARTIAL RULED SURVEY FOR FACILITATED TABLE FORMATION

[75] Inventors: Kilho Shin; Akira Suzuki, both of Kanagawa, Japan

[73] Assignee: Fuji Xerox Co., Ltd., Tokyo, Japan

[21] Appl. No.: 672,503

[22] Filed: Jun. 28, 1996

Related U.S. Application Data

[63] Continuation of Ser. No. 208,412, Mar. 10, 1994, abandoned.

[30] Foreign Application Priority Data

Mar. 12, 1993 [JP] Japan .................................. 5-079023

[51] Int. Cl.⁶ .................................................. G06F 17/30
[52] U.S. Cl. ........................ 707/509; 707/102; 707/505; 707/510
[58] Field of Search .................................... 395/770, 771, 395/764, 767–769, 613; 707/505–507, 509, 510

[56] References Cited

U.S. PATENT DOCUMENTS

| | | | |
|---|---|---|---|
| 4,967,341 | 10/1990 | Yamamoto et al. | 395/600 |
| 5,105,365 | 4/1992 | McDaniel et al. | 364/496 |
| 5,272,628 | 12/1993 | Koss | 364/419.19 |
| 5,367,619 | 11/1994 | Dipaolo et al. | 395/770 |
| 5,418,950 | 5/1995 | Li et al. | 395/600 |
| 5,438,664 | 8/1995 | Kashio | 395/765 |
| 5,537,633 | 7/1996 | Suzuki et al. | 395/611 |
| 5,557,787 | 9/1996 | Shin et al. | 395/613 |
| 5,613,131 | 3/1997 | Moss et al. | 395/765 |

FOREIGN PATENT DOCUMENTS 3-206552  9/1991  Japan .

*Primary Examiner*—Thomas G. Black
*Assistant Examiner*—Hosain T. Alam
*Attorney, Agent, or Firm*—Finnegan, Henderson, Farabow, Garrett & Dunner, L.L.P.

[57] ABSTRACT

A table forming apparatus useful in forming a complex or large-sized table. In a partial ruled table survey model forming unit, a user selects a model for a survey of a partial ruled table, and designates necessary parameters, whereby a survey of partial ruled table is produced. Data is inputted by a partial table input unit with employing this survey, thereby producing a partial table which will then be stored into a partial table retaining unit. On the other hand, when the user defines information about a relationship between the partial tables, e.g., adjacent information and subdivision information by a partial table relationship information defining unit, this relationship information is retained in a partial table relationship retaining unit. A plurality of partial tables retained by the partial table retaining unit are synthesized by a synthesizing unit with use of the relationship information retained in the partial table relationship information retaining unit, whereby an overall table is formed.

11 Claims, 19 Drawing Sheets

FIG. 2

COLUMN

|   |   | a |   |   | b |   |   | c |   |   |
|---|---|---|---|---|---|---|---|---|---|---|
|   |   | d | e | f | g | h | i | j | k | l |
| A | C |   |   |   |   |   |   |   |   |   |
|   | D |   |   |   |   |   |   |   |   |   |
|   | E |   |   |   |   |   |   |   |   |   |
| B | F |   |   |   |   |   | 12|   |   |   |
|   | G |   |   |   |   |   |   |   |   |   |

ROW

ITEM CELL

FIG. 3

```
\begin{tabular}{|l|l|l|r|r|}\hline
\multicolumn{2}{|c|}{--}
            & \multicolumn{1}{c|}{1982}
            & \multicolumn{1}{c|}{1983} \\ \hline
CONSUMPTION    & PETROLEUM       & 143960 & 150250 \\ \cline{2-4}
BY HOME        & GAS             & 4620   & 17000  \\ \cline{2-4}
               & ELECTRIC POWER  & 35900  & 37630  \\ \cline{2-4}
               & COAL            & 3710   & 3060   \\ \hline
CONSUMPTION    & PETROLEUM       & 44760  & 42110  \\ \cline{2-4}
BY INDUSTRY    & GAS             & 2876   & 3454   \\ \cline{2-4}
               & ELECTRIC POWER  & 56745  & 34561  \\ \cline{2-4}
               & COAL            & 34513  & 23445  \\ \hline
CONSUMPTION    & PETROLEUM       & 3452   & 4456   \\ \cline{2-4}
BY AGRICULTURE & GAS             & 3453   & 434566 \\ \cline{2-4}
               & ELECTRIC POWER  & 23430  & 45660  \\ \cline{2-4}
               & COAL            & 5460   & 5560   \\ \hline
```

FIG. 12

| | A | B | |
| --- | --- | --- | --- |
| | | C | D |
| E | a | b | c |
| F | d | e | f |

FIG. 27

|  |  | A | B |
|---|---|---|---|
| 1990 | FORMER PERIOD | 1 | 1 |
|  | LATTER PERIOD | 1 | 1 |
|  | SUBTOTAL | 2 | 2 |
| 1991 | FORMER PERIOD | 3 | 3 |
|  | LATTER PERIOD | 3 | 3 |
|  | SUBTOTAL | 6 | 6 |
|  | TOTAL | 8 | 8 |

FIG. 28

|  |  | A | B |
|---|---|---|---|
| 1990 | FORMER PERIOD | 1 | 1 |
|  | LATTER PERIOD | 1 | 1 |
|  | SUBTOTAL | 2 | 2 |
| 1991 | FORMER PERIOD | 3 | 3 |
|  | LATTER PERIOD | 3 | 3 |
|  | SUBTOTAL | 6 | 6 |

|  |  | A | B |
|---|---|---|---|
| 1992 | FORMER PERIOD | 7 | 7 |
|  | LATTER PERIOD | 7 | 7 |
|  | SUBTOTAL | 14 | 14 |

| TOTAL | 22 | 22 |
|---|---|---|

TABLE FORMING APPARATUS EMPLOYING A PARTIAL RULED SURVEY FOR FACILITATED TABLE FORMATION

This application is a continuation of application Ser. No. 08/208,412, filed Mar. 10, 1994, now abandoned.

BACKGROUND OF THE INVENTION

1. Field of the Invention

The present invention relates to a table forming apparatus capable of simply forming a table with a complex format, or a large size under easy operation.

2. Description of the Related Art

Tables have been widely utilized as a means for sorting out, or systematically grouping complex information to furnish the systematically grouped information to readers. Even when documents are nowadays formed by electronic appliances, such tables are still one of the major document constructive components.

FIG. 2 is an explanatory diagram for explaining a general-purpose table. The table is constructed of index cells (or title cells) and data cells. Items appearing in the index cells are called as index items. Data appearing in the data cells is called as element data. Normally, most tables appearing in a document are to represent a corresponding relationship between a combination of the index items and the element data. The combination of the index items is called as an index item string (or title string). Element data described in a data cell where a specific row and a specific column intersect with each other, corresponds to an index item string defined by combining an index item string appearing in the specific row with another index item string appearing in the specific column. There are some possibilities that a plurality of index items appear in a single row and a single column. For example, in a row and a column, which are indicated by dot lines in FIG. 2, an index item string (B, F, b, i) defined by combining row index items B, F with column index items b, i, corresponds to element data "12". Cells in which the respective items are described are called as item cells.

Document forming/editing apparatuses such as DTP (Desk Top Publishing) and wordprocessors are normally equipped with table forming functions. Basically, there are two table forming methods for these conventional table forming functions, namely the WYSIWYG (What You See Is What You Get) method and the command burying method.

The WYSIWYG method has been conventionally utilized in most DTPs and wordprocessors. The major feature of this WYSIWYG method is such that a so-called "ruled table" is displayed on a screen, and contents of the corresponding items are buried into item cells in the displayed ruled table, thereby forming a table. Here, it should be noted that a "ruled table" implies a frame constituted by a ruled line, whereas an "item cell" implies a rectangular region surrounded by vertical and horizontal adjoining ruled lines. For instance, the inputting method as described in Japanese Patent Unexamined Publication No. Hei. 3-206552 corresponds to the WYSIWYG method. A description will now be made of a sequence to form a table by a user in accordance with this inputting method.

First, a survey of a ruled table is determined. It should be understood that a survey of a ruled table represents such a ruled table in which only a relative positional relationship between ruled lines is determined, while an absolute position of a ruled line and an absolute interval between the ruled lines are undetermined. To determine the survey of the ruled table, the corresponding relationships among the index item group and the data item group must be investigated over the entire items to be entered, and a decision must be made how to draw the ruled lines in order to form a table capable of having sufficient index item cells and sufficient data cells (combined cells are called as "item cells").

Next, a user forms a ruled table by way of a system based upon the decided survey of the ruled table. As the method for forming the ruled table, there are provided the method for repeatedly performing such operations as subdivision, transfer, deletion with respect to the rows and columns of this ruled table, and also the method for repeatedly performing such operations as addition/deletion of ruled lines, change in lengths of ruled lines with respect to the ruled table.

Finally, either the index items or the data are inputted into the respective item cells of the formed ruled table, so that a desired table can be completed.

On the other hand, the command burying method is employed in tabular environments and roff of LATEX, and represents a table as a text in which control characters indicative of boundaries between character strings of an item content and between the successive items, and also commands for instructing drawing of ruled lines are mixed. FIG. 3 is an explanatory diagram for representing an example of a table formed by LATEX. The control character "&" indicates the boundary between the items within the row. The program of LATEX is executed in such a manner that the control character "&" is interrupted as the command to draw a vertical ruled line, and the vertical ruled line is drawn between the item contents which sandwich this control character "&". The control character "\\" shows an end of a row, whereas commands "\hline" and "\cline" instruct to draw a horizontal line. Although a user may designate a position of a ruled line, the apparatus automatically calculates the position of the ruled line when no designation is made.

When the user forms a table in accordance with this command burying method, he firstly makes a decision about a "survey of a ruled table". Then, based upon the determined survey of the ruled table, the character strings, the control characters and the commands of the item content are sequentially inputted in accordance with the rule. Upon completion of inputting operation, the formatter is initiated to structure a layout. In accordance with the above-explained procedure, a desirable table is formed.

In any of the above-explained conventional table forming methods, a decision by a user is first made of a survey of a ruled table. Thereafter, a desired table is actually produced. However, these conventional table forming methods own the following problems.

As a first problem, the user must predict the final shape of the desired table from the beginning of the table production. That is, the user must consider the survey of the desirable ruled table, namely how to draw the final shape of this table before entering into the table forming work in these conventional table forming methods, resulting in cumbersome works. At this time, the survey of this ruled table must provide necessary item cells enough to enter all of the index items and the element data items into the desirable table while keeping the correct corresponding relationship. When either the number of index items and data items becomes large, or the corresponding relationship among these items becomes complex, this item entering work considerably becomes cumbersome. Furthermore, when the decided survey of the desirable ruled table becomes more complex, the actual table forming operation in accordance with such a complex survey of the desirable ruled table also requires cumbersome works.

In the conventional WYSIWYG method, a ruled table must be formed by operating rows, columns, and ruled lines by a user himself. If a shape of a desired table becomes complex, then the number of required operations is necessarily increased. Also, in the conventional command burying method, since a ruled table is not represented on a display, any user must produce a text without actually observing the ruled table. Consequently, when a shape of a desired table becomes complex, it is very difficult to form this table under one table forming operation without any erroneous table forming work. The text to be tabulated can be hardly read since the control characters and the commands are buried among the characters. Not only finding such erroneous inputs from the text is practically very difficult, but also such situations may cause erroneous inputs. As a result, there are many possibilities that the user cannot become aware of such erroneous inputs until he has initiated the formatter and formed the actual layout. Otherwise, every time the erroneous input is found out, the present text must be corrected and then the formatter must be reinitiated. Since a time duration required to produce the layout by the formatter is not always short, not only the work becomes cumbersome, but also it takes a long time.

There is another problem in the conventional table forming methods that since a single table is collectively formed, it is rather difficult to reuse a portion of the formed table when another table is intended to be formed, whose index items and element data are practically shared by those of the first-mentioned table.

In addition, since a single table is collectively produced in the conventional table forming methods, it is difficult to form a table with a large size. The WYSIWYG method has such a drawback that when a large-sized table sticking out from one screen is intended to be formed, the necessary index items will be scrolled out from the screen. As a result, it cannot be correctly grasped that the presently entered data corresponds to which index item, that may cause erroneous input operations. To the contrary, when the corresponding index item is confirmed, it is required to confirm this index item by scrolling the screen. In this case, since the data cell being now entered is scrolled out from the screen, the screen must be again scrolled in order to continue the input operation. As described above, very cumbersome works are necessarily required when a large-sized table is inputted. In the command burying method, since the text to be formed is hardly readable, it is practically difficult to maintain the correct corresponding relationship between the index item and the input data. When the size of the table becomes large, a total amount of text is considerably increased, so that correctly keeping the corresponding relationship between the index item and the input data makes very difficult.

SUMMARY OF THE INVENTION

The present invention has been made in an attempt to solve the above-explained conventional problems, and therefore, has an object to provide a table forming apparatus capable of simply forming even a complex table and a large-sized table, and also capable of reusing the formed table with maintaining better operabilities.

To achieve the above-described object, the invention provides a table forming apparatus including: partial ruled table survey forming means for forming a survey of a partial ruled table, partial table input means for inputting a content of an item into the survey of the partial ruled table, functioning as an input frame, formed by the partial ruled table survey forming means, to form a partial table, partial table relationship information defining means for defining a relationship between the partial tables, and synthesizing means for synthesizing the partial tables to form a desired table based on both information about the partial table completed by the partial table input means and information about the relationship between the partial tables defined by the partial table relationship information defining means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 2 is an explanatory diagram of a general-purpose table;

FIG. 3 is an explanatory diagram for explaining an example of a table represented by LATEX;

FIG. 12 is an explanatory diagram of a table to be produced;

FIG. 27 is an explanatory diagram showing another example of forming a table; and FIG. 28 is an explanatory diagram indicating an example to add a partial table.

DETAILED DESCRIPTION OF THE PREFERRED EMBODIMENTS

Figure 1:
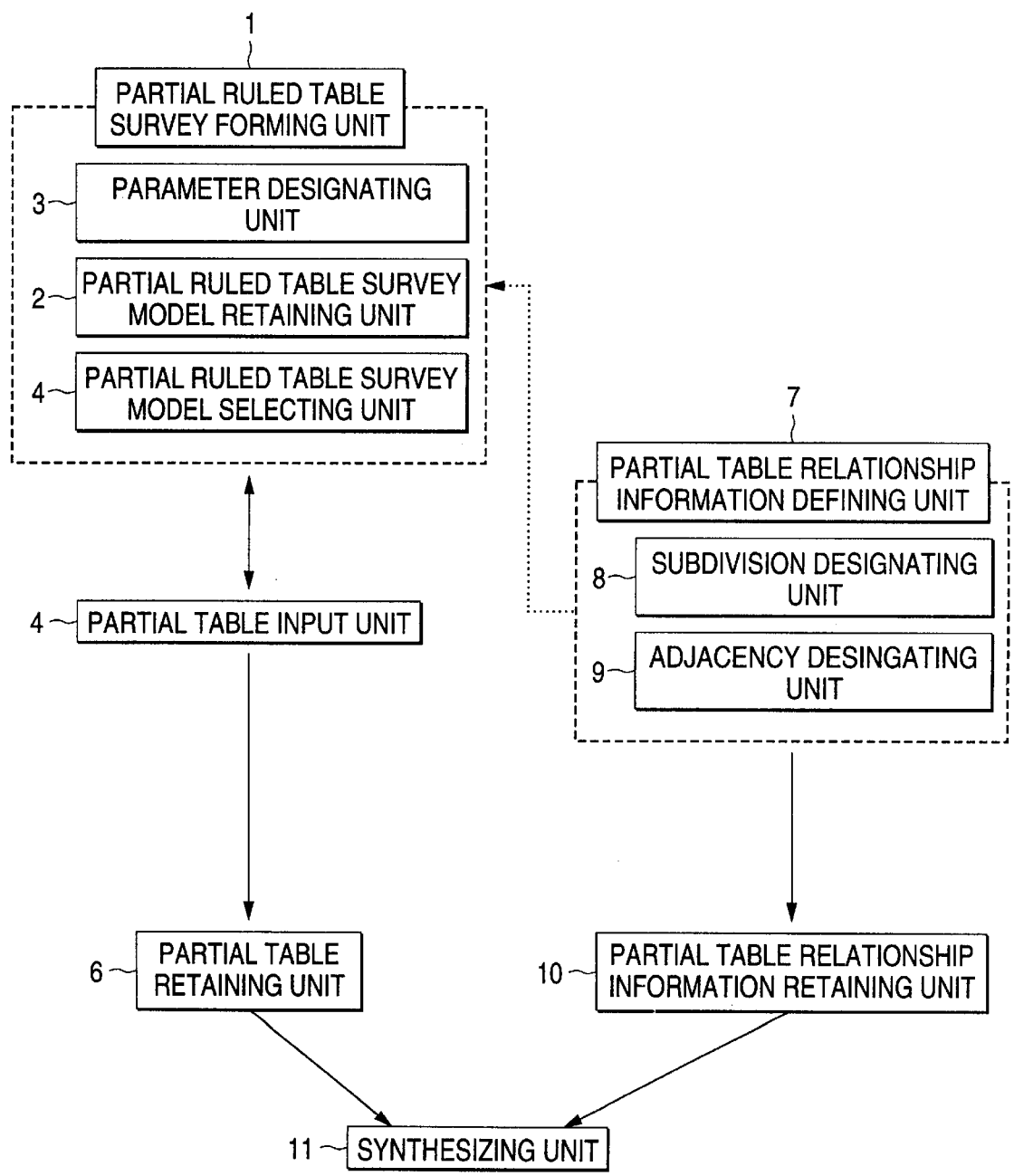
FIG. 1 is a schematic block diagram showing an arrangement of a table forming apparatus according to an embodiment of the present invention.

FIG. 1 schematically indicates an arrangement of a table forming apparatus according to an embodiment of the present invention. In this figure, reference numeral 1 designates a partial ruled table survey forming unit; reference numeral 2, a partial ruled table survey model retaining unit; and reference numeral 3, a parameter designating unit. Further, reference numeral 4 designates a partial ruled table survey model selecting unit; reference numeral 5, a partial table input unit; reference numeral 6, a partial table retaining unit; and reference numeral 7, a partial table relationship information defining unit. In addition, reference numeral 8 designates a subdivision designating unit; reference numeral 9, an adjacency designating unit; reference numeral 10, a partial table relationship information retaining unit; and reference numeral 11, a synthesizing unit.

A partial table is formed in such a manner that a ruled table having a survey of a simple ruled table is used as an input frame, and index items and data items, which correspond to the respective item cells are buried into the input frame. The partial ruled table survey forming unit 1 forms the survey of the partial ruled table functioning as the input frame. The partial ruled table survey forming unit 1 may be arranged by including the partial ruled table survey model retaining unit 2, the parameter designating unit 3, and the partial ruled table survey model selecting unit 4. It is of course possible to produce a survey of a ruled table without using a model. In this case, no longer the partial ruled table survey model retaining unit 2, the parameter designating unit 3, and the partial ruled table survey selecting unit 4 are required.

Figure 4:
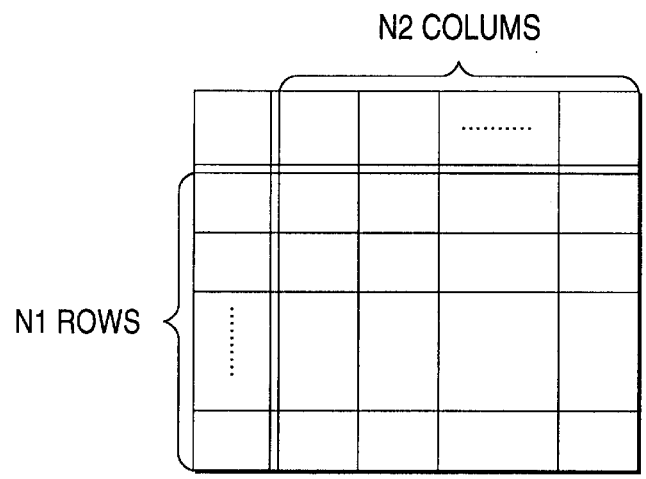
FIG. 4 is an explanatory diagram for explaining a first model of a survey of a partial ruled table.

The partial ruled table survey model retaining unit 2 retains a model (specimen) of a survey of a partial ruled table functioning as the input frame. The parameter designating unit 3 is such a unit for designating a parameter or parameters required to produce a survey of a ruled table actually utilized from a model of a survey of a ruled table. It should be understood that a model of a survey of a ruled table implies information which is employed to determine a single survey of a ruled table in combination with parameters designated by the parameter designating unit 3, if necessary. Alternatively, this model of the survey of the ruled table may be this survey of the ruled table per se. FIG. 4 is an explanatory diagram showing a first model of a survey of a partial ruled table. Consider, for example, such a case that a ruled table having a simple rectangular shape consisting of four rectangular regions is formed. In this case, a model as shown in FIG. 4 is prepared, and a single ruled table having a rectangular shape consisting of four rectangular regions may be formed by designating the number of rows N1 and the number of columns N2 as parameters.

A model of a survey of a partial ruled table may be retained in the form of a file or a program into an internal storage device of the partial ruled table survey model retaining unit 2, otherwise may be retained in the form of a file or a program into an external storage device such as a storage disk. In this case, a plurality of models may be retained. When a plurality of models are retained, a selection is made to determine which model is employed by the partial ruled table survey model selecting unit 4. This partial ruled table survey model selecting unit 4 may be commonly utilized with the parameter designating unit 3. In other words, it may be arranged to select which model is utilized by way of the parameter designating unit 3. It is of course possible to separately employ the partial ruled table survey model selecting unit 4.

The partial table input unit 5 is a unit for forming a partial table in such a manner that the survey of the partial ruled table produced by the partial ruled table survey forming unit 1 is used as an input frame, and a user inputs data items and index items in accordance with the input frame. The partial table produced by the partial table input unit 5 must contain at least the information required to indicate the survey of the ruled table, and the information for instructing either the index items or the data items to be positioned in the respective item cells within the survey of the ruled table. However, for instance, this partial table need not contain the information about the actual size of the survey of the ruled table.

As the partial table input unit 5, it may be conceived such a method for representing the input frame on a display or the like, whereby the user puts the content of the items corresponding to the item cells on the display, for example. Also, there is another method for reading the data which have been arranged in a specific format and for automatically allocating the read data to the respective items of the input frame. Any other partial table inputting methods may be employed if the partial table capable of satisfying the above-described conditions is produced.

The partial table retaining unit 6 retains, or stores the partial table formed by the partial table input unit 5. This partial table retaining unit 6 may be arranged by, for example, an internal storage device belonging to the table forming apparatus, and an external storage device such as a memory disk. Alternatively, this partial table retaining unit 6 may be arranged by that the partial tables themselves are stored in the external storage device such as the memory disk, only a pointer to the relevant partial table is retained in the internal storage device, and then this partial table is referred by way of the pointer, if necessary. The partial table retaining unit 6 may be omitted in such an arrangement that the partial table data is directly sent from the partial table input unit 5 to the synthesizing unit 11.

The partial table relationship information defining unit 7 is a unit for defining by a user a relative positional relationship between the partial table formed by the partial table input unit 5 and another partial table, and also information about a relationship of the partial tables within the overall table such as the relative position. Although the information about the relationship among the partial tables is defined by the user in this embodiment, such information may be automatically defined by the table forming apparatus. As the partial table relationship information defined by the partial table relationship information defining unit 7, there are, for instance, adjoining information such that a first partial table adjoins a second partial table at the right side, left side, upper side, or lower side, and subdivision information such that the first partial table corresponds to a subdivided specific region of the second partial table. Here, it should be understood that the first partial table corresponding to the subdivided second partial table implies such a table obtained by subdividing by the ruled lines, the item cell of the first partial table belonging to the region designated within the second partial table. To designate such partial table relationship information, the subdivision designing unit 8 and the adjacency designing unit 9 may be employed in the partial table relationship defining unit 7. The adjacency designating unit 9 designates the adjoining information among the partial tables. Also, as the positional information to be designated, it may be so arranged to designate the absolute position of the partial table within the table to be produced. Also, it may be arranged to designate the relative position of the respective partial tables. The subdivision designating unit 8 designates the subdivision of the partial table.

The partial table relationship information retaining unit 10 retains therein the relative positional relationship among the partial tables defined by the partial table relationship information defining unit 7, and also the relationship information of the partial table such as the positional relationship within the overall table. As the partial table relationship information retaining unit 10, either the internal storage device employed in the table forming apparatus, or the external storage device such as the memory disk may be utilized. Alternatively, these storage devices may be commonly used with the partial table retaining unit 6, and the partial table relationship information may be retained together with the information about the partial table. When it is so arranged that the relationship information about the partial table is directly inputted into the synthesizing unit 11, the partial table relationship information retaining unit 7 is not required.

The synthesizing unit 11 synthesizes the partial tables formed by the partial table input unit 5 based upon the positional information of the respective partial tables defined by the partial table positional information defining unit 6, thereby forming the overall table. The synthesized table may be displayed by utilizing such a representing device as a printer and a display, or may be stored as a file into the external storage device, e.g., the memory disk. Also, this synthesized table may be used as a portion of a document, e.g., as input data to a document editing system. Furthermore, the synthesizing unit 11 may be coupled to a communication line so as to transfer this synthesized table to another computer.

The operation of the table forming apparatus according to the embodiment of the present invention will now be described. This table forming apparatus finally synthesizes an overall table by repeatedly inputting a portion of a table having a survey of a locally simple-shaped ruled table. A first attention is paid to a portion of a table having a survey of a simple ruled table. When the survey of this ruled table can be produced from the model or specimen retained in the partial ruled table survey model retaining unit 2, a user designates the necessary parameter by the parameter designating unit 3. If a plurality of models have been stored, then the user selects the proper model by the partial ruled table survey model selecting unit 4. In response to the information for selecting the proper model and the parameter information, the partial ruled table survey forming unit 1 forms the survey of the partial ruled table functioning as the input frame.

Next, the produced survey of the partial ruled table is used as the input frame, the user inputs the data items and the index items into this input frame by employing the partial table input unit 5, whereby a partial table is produced. Thus, the produced partial table is retained in the partial table retaining unit 6.

On the other hand, when the user defines the relationship information about the partial table via the partial table relationship information defining unit 7, the defined information is retained in the partial table relationship information retaining unit 10. At this time, when a certain partial table should be arranged adjacent another partial table, the adjacent information is defined by employing the adjacency designating unit 9. When a portion of the input frame should be subdivided in accordance with another survey of the ruled table, the user designates the relevant portion within the input frame by employment of the subdivision designating unit 9, and thereafter the user selects a model of a newly required survey of a partial ruled table, so that the subdivided input frame is determined. The user forms a partial table in accordance with the newly decided input frame by employing the partial tale input unit 5. At this time, an automatic calculation is carried out by the partial table relationship information defining unit 7 as to how to subdivide which portion of the original partial table so as to obtain a newly formed and subdivided partial table. Then, this newly formed partial table is retained in the partial table relationship information retaining unit 10.

The above-described operations are repeatedly performed until the overall table is converted by the partial tables. When the entire table is converted by the formed partial tables, the overall table may be formed by the synthesizing unit 11. At this time, in case that there is such a partial table which cannot be calculated by the partial relation information retaining unit 10, the position of the partial table in the entire table is designated by the user with employment of the partial table relationship information defining unit 7. In this defining manner, the overall table is formed and outputted from the synthesizing unit 11.

The selection of the model and setting of the parameter in the partial ruled table survey forming unit 1, the input of the partial table by the partial table input unit 5, and the input of the definition of the relationship information in the partial table relationship information defining unit 7 may be performed by a keyboard, a pointing device, or the like utilized by the user. These inputting operations may be carried out with reference to the ruled lines and the instruction information indicated on the display. The formation of the partial table, the definition of the relationship information about the partial table, and the synthesizing process may be performed under interruptive conditions. Also, the formation of the partial table may be separately performed from the definition of the relationship information of the partial table, and the synthesizing process may be performed by the batch process.

Description will now be made of a first concrete example in the table forming apparatus according to the embodiment of the present invention. It is now assumed that the partial ruled table survey model retaining unit 2 retains two models of the survey of the partial ruled table. Each of these models owns a survey of a ruled table as illustrated in FIG. 4 or FIG.

Figure 5:
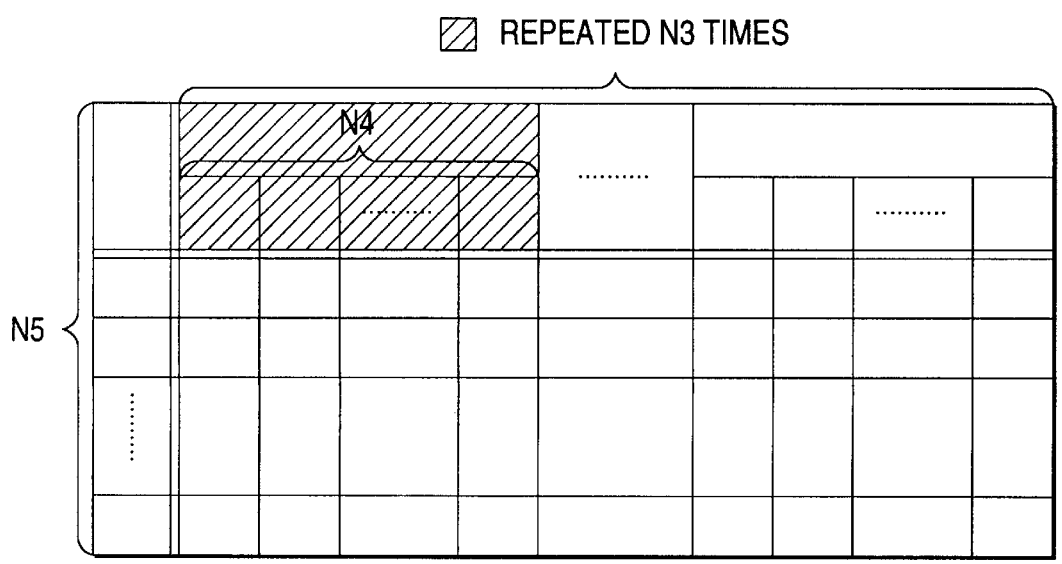
FIG. 5 is an explanatory diagram for explaining a second model of a survey of a partial ruled table.

5. FIG. 5 is an explanatory diagram showing a second model of the survey of the partial ruled table. The second model shown in FIG. 5 illustrates a survey of a ruled table in which a column index is constructed of a parent index and child indexes. In the column index, N3 pieces of blocks are arranged which are constructed of N4 pieces of child indexes belonging to one parent index. Also, a row index is so arranged that N5 pieces of independent indexes are located. The model shown in FIG. 4 determines one survey of a ruled table by designating two parameters N1 and N2 by way of the parameter designating unit 3. The model of FIG. 5 determines one survey of a ruled table by designating three parameters N3, N4 and N5 shown in this figure by way of the parameter designating unit 3. A selection is made by the partial ruled table survey model selecting unit 4 as to determined which model is employed.

The partial table input unit 5 represents the input frame on the display, and while the user moves a cursor on the display by employing the pointing device such as the keyboard and the mouse, the data are sequentially entered into the item cells within the input frame by employing the keyboard or the like. The partial tables produced by the partial table input unit 5 are retained by the partial table retaining unit 6.

Figure 6:
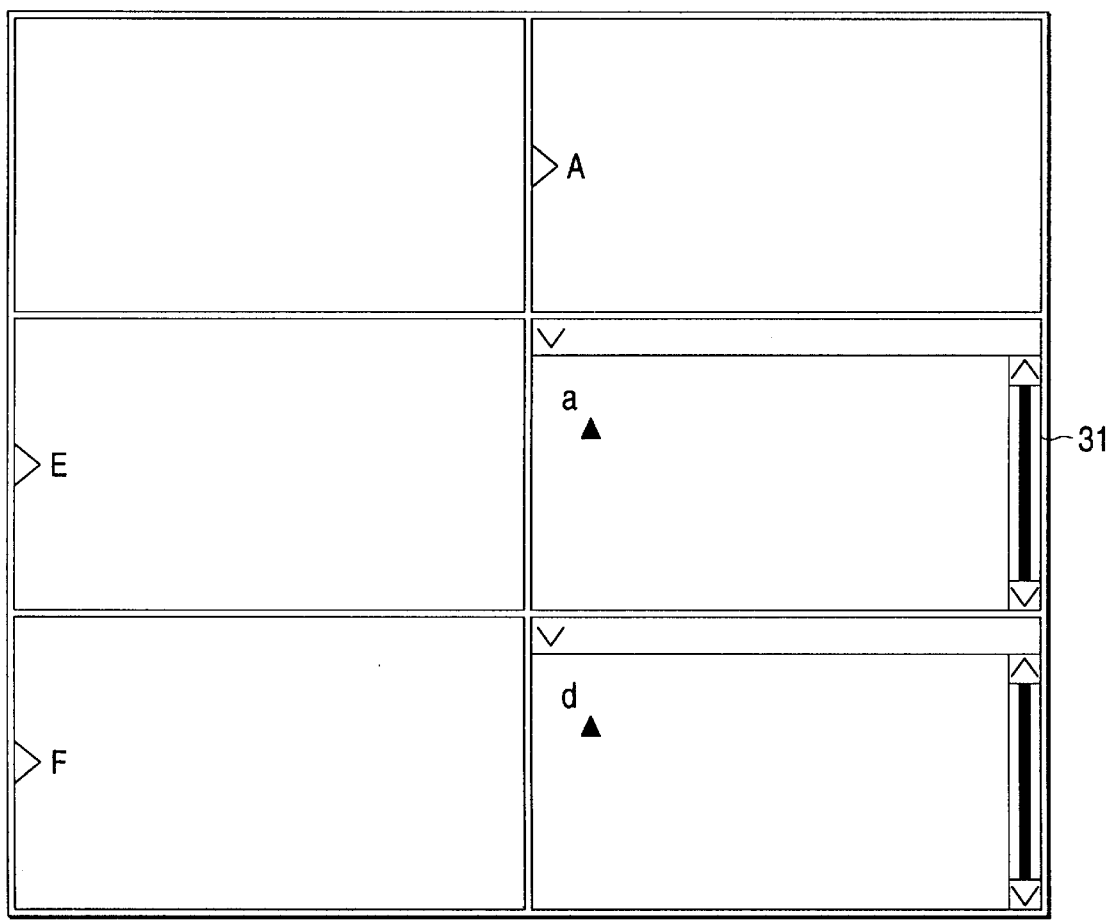
FIG. 6 is an explanatory diagram of a first input example of an item content inputted by a partial table input unit.
Figure 7:
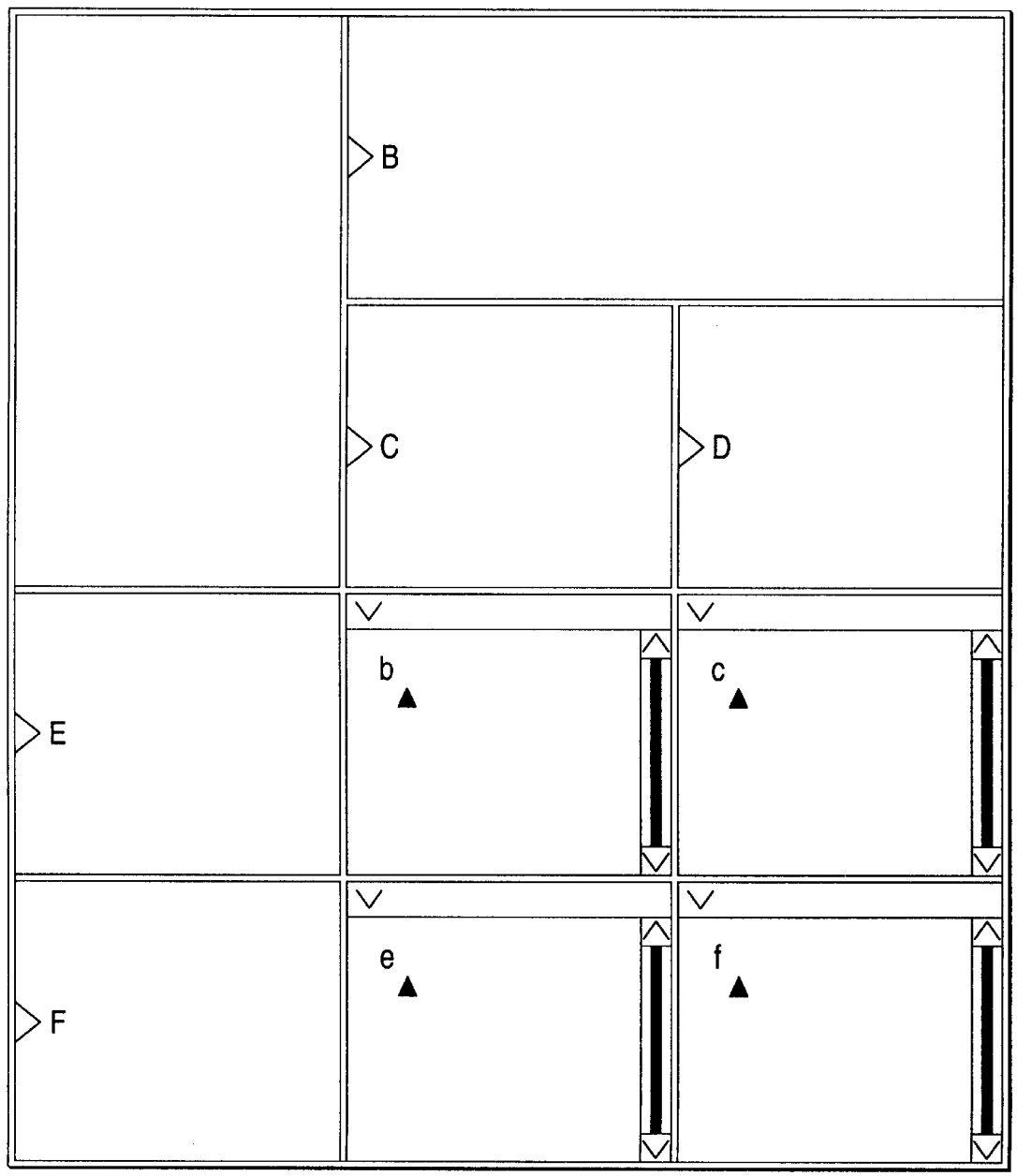
FIG. 7 is an explanatory diagram of a second input example of an item content inputted by the partial table input unit.

FIGS. 6 and 7 are explanatory diagrams for explaining a first input sample and a second input sample of an item content inputted by the partial table input unit 5. In these figures, reference numeral 31 designates a scroll bar. For instance, the model of the survey of the ruled table having such a rectangular shape consisting of four rectangular regions as shown in FIG. 4 is employed, and the parameters are designated as N1=2 and N2=1, and the survey of the ruled table is formed and utilized as an input frame. An example for indicating this input frame is represented in FIG. 6. The respective cells shown in FIG. 6 correspond to item cells into which data items and index items are entered. In this figure, "A" is entered as the column index, "E" and "F" are entered as the row indexes, and "a" and "d" are entered as the data items. When these data are inputted with overflowing the input frame, a scroll operation is carried out within the input frame. A region under representation may be recognized by the scroll bar 31. A scroll instruction may be also executed by using the scroll bar 31.

In FIG. 7, there is shown an display sample in case that a survey of a ruled table is produced by employing the model of the partial ruled table as shown in FIG. 5 and setting the parameters as N3=1, N4=2 and N5=2. In this figure, "B" is entered as the parent index of the column index, "C" and "D" are entered as the child indexes, "E" and "F" are entered as the row indexes, and also "b", "c", "e" and "f" are entered as the data items.

In the partial table relationship information defining unit 7, the information about the adjoining relationship of the partial tables formed by the partial table input unit is defined by the adjacency designating unit 9 and then retained by the partial table relationship information retaining unit 10.

Figure 8:
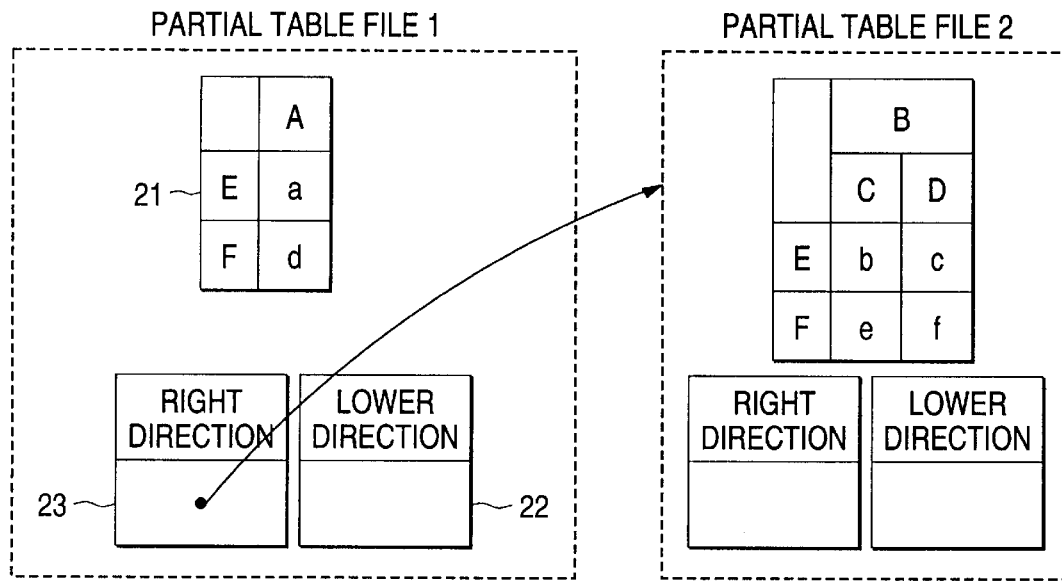
FIG. 8 is an explanatory diagram showing an example of a partial table file in a first concrete example.

It is now assumed in this concrete example that the information about the relationship between the partial tables and the partial tables are stored as a partial table file constructed of a partial table retaining unit and a partial table relationship information retaining unit. A single partial table file is allocated to each of the partial tables to be formed. FIG. 8 is an explanatory diagram showing an example of the partial table file in a first concrete example. In this figure, reference numeral 21 designates a partial table retaining unit; reference numeral 22, a lower-direction-junction pointer retaining unit; and reference numeral 23, a right-direction-junction pointer retaining unit. The partial table relationship information unit is arranged by two sets of information about the lower-direction-junction pointer retaining unit 22 and the right-direction-junction pointer retaining unit 23. In the lower-direction-junction pointer retaining unit 22, if there is a partial table adjoining to and just under the partial table retained in the partial table retaining unit 21, then a pointer to a partial table file for storing this partial table is retained. Also, in the right-direction-junction pointer retaining unit 23, if there is a partial table near the partial table in the right direction, retained in the partial table retaining unit 21, then a pointer to a partial table file for storing this partial table. FIG. 8 represents that the partial table retained in the partial table retaining unit of the partial table file 2 is located adjoining to the partial table in the right direction, retained in the partial table retaining unit 21 of the partial table file 1.

When a certain partial table is located adjacent to another partial table in either the lower direction, or the right direction, for instance, a user writes a pointer to a partial table file for storing therein the adjacent partial table into either the lower-direction-junction pointer retaining unit 22, or the right-direction-junction pointer retaining unit 23 within the partial table file by employing the adjacency designating unit 9 of the partial table relationship information defining unit 7, so that it is possible to designate that two partial tables own adjacent relationship to each other. Alternatively, the partial table relationship information may be automatically defined by the table forming apparatus without having cumbersome works by the user. For example, in case of FIG. 8, since the row indexes of the partial tables in the partial table file 1 and the partial table file 2 are coincident with each other, and the partial table file 1 has been formed prior to the partial table file 2, the apparatus may automatically define the relationship information in such a manner that the partial table file 2 is designated by the right-direction-junction pointer of the partial table file 1. If the relationship between the right file and the left file is deserved to be changed, then the user merely substructs the original pointers by new pointers by employing the partial table relationship information defining unit.

Figure 9:
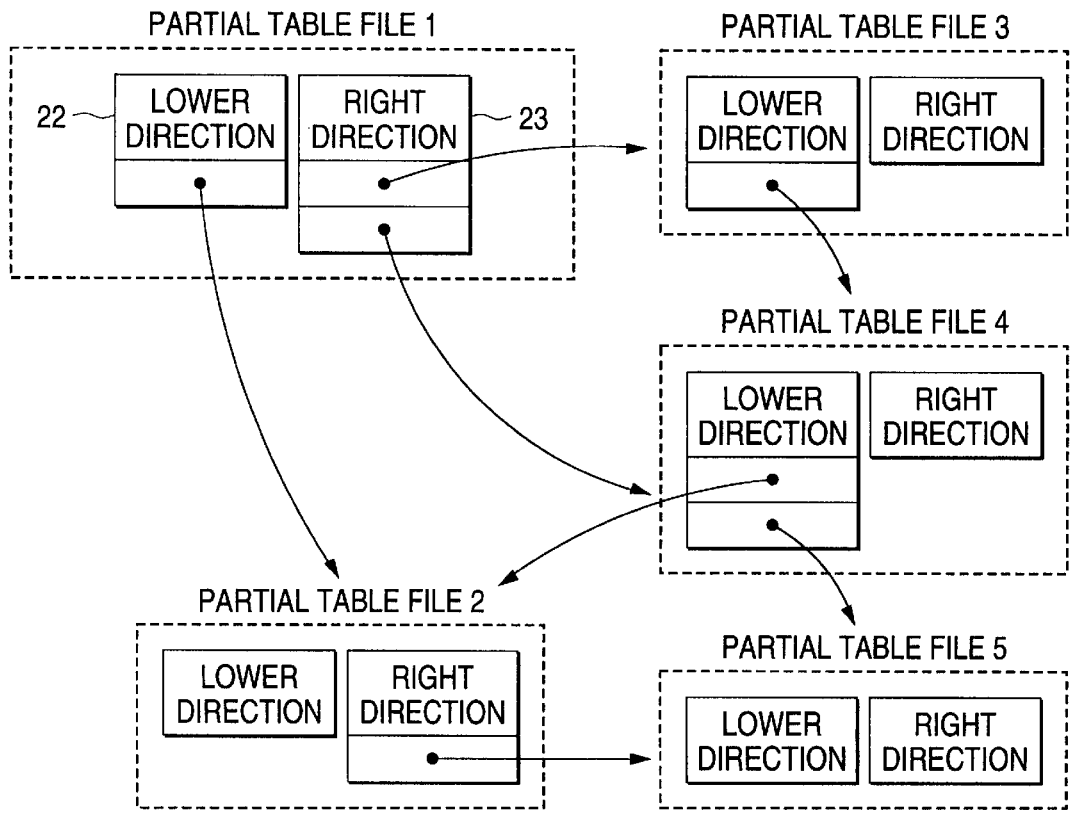
FIG. 9 is an explanatory diagram showing another example of the partial table file in the first concrete example.
Figure 10:
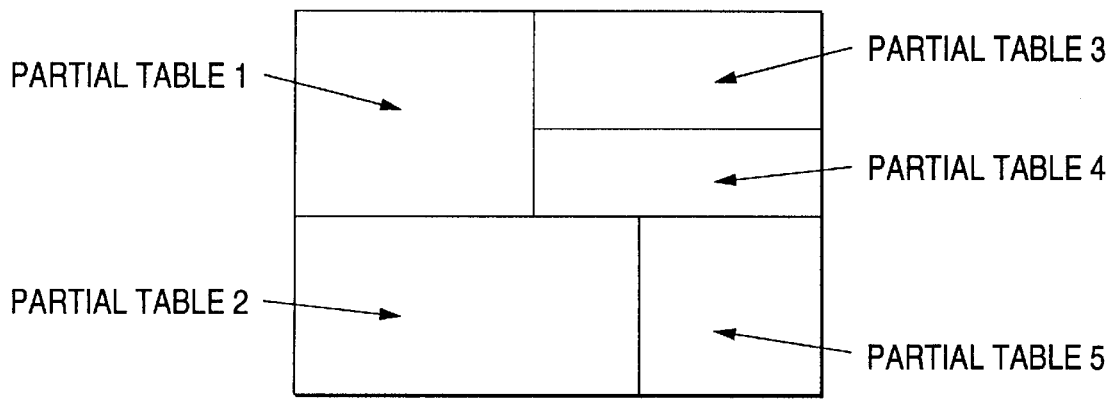
FIG. 10 is an explanatory diagram of a subdivided partial table.

FIG. 9 is an explanatory diagram showing another example of the partial table file in the first concrete example. FIG. 10 is an explanatory diagram of subdivided partial tables. In FIG. 8, it has been so arranged that a single pointer is retained in the lower-direction-junction pointer retaining unit 22 and the right-direction-junction pointer retaining unit 23. Alternatively, it may be arranged to retain a list constructed of a plurality of pointers. With such a structure, as a table shown in FIG. 10, it is possible to describe such a relationship that a plurality of partial tables are located adjoining to each other in a complex condition. For instance, in FIG. 10, partial tables 3 and 4 are located adjacent to a partial table 1 in the right direction. As to the partial table 4 of FIG. 10, there are a partial table 2 and a partial table 5 adjacent to the partial table 4 in the lower direction. In such a case, as illustrated in FIG. 9, both a pointer for pointing out the partial table file 3 corresponding to the partial table 3 and a pointer for pointing out the partial table file 4 corresponding to the partial table 4 are retained in the right-direction-junction pointer retaining unit 23 of a partial table file 1 corresponding to the partial table 1. Also, it may be so constructed that a pointer for pointing out the partial table file 2 corresponding to the partial table 2 and a partial table file 5 corresponding to the partial table 5, is retained in the lower-direction-junction pointer retaining unit 22 of the partial table file 4 corresponding to the partial table 4. As described above, since it is so arranged that the lists constructed of a plurality of pointers are retained into the lower-direction-junction pointer retaining unit 22 and the right-direction-junction pointer retaining unit 23, such complex adjoining relationship of the partial tables can be described.

Figure 11:
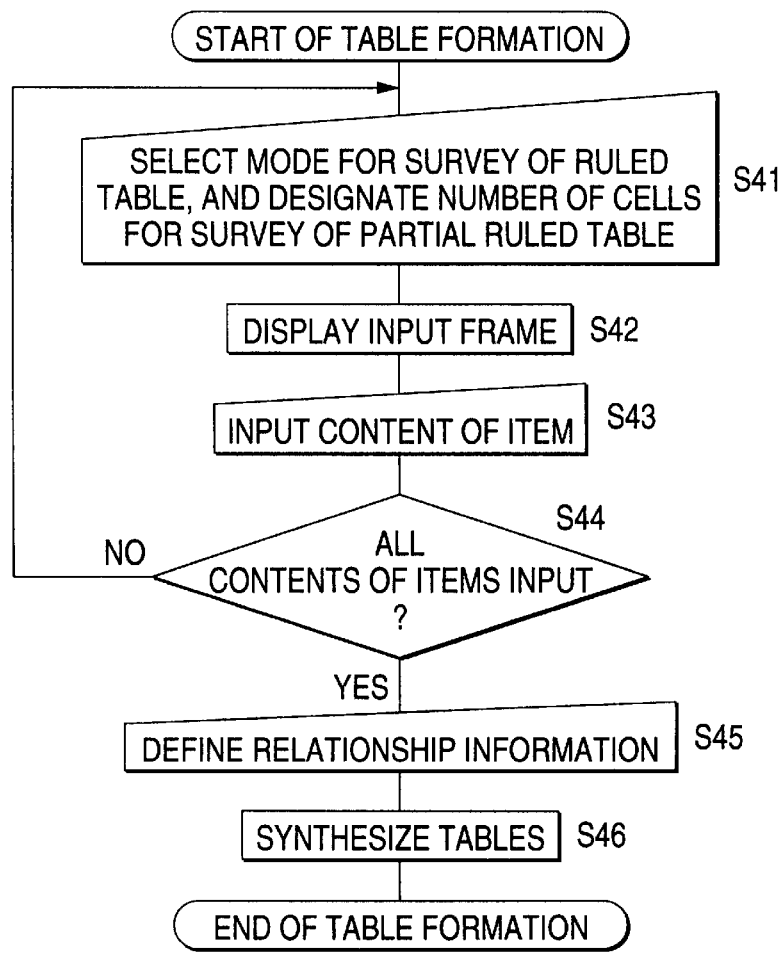
FIG. 11 is a flow chart for explaining the operation of the first concrete example in he table forming apparatus according to the embodiment of the present invention.
Figure 12:
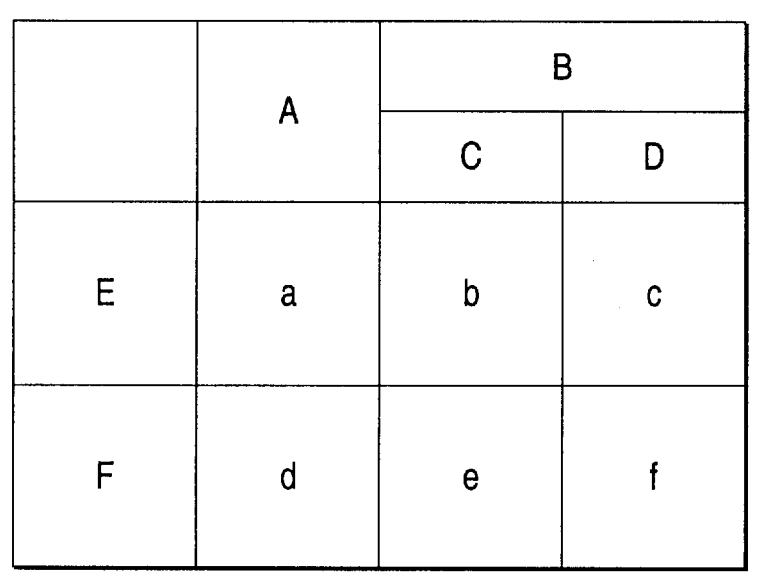

FIG. 11 is a flow chart for explaining the operation of the first concrete example in the table forming apparatus according to the embodiment of the present invention. FIG. 12 is an explanatory diagram of a table to be formed. In the below-mentioned explanation, an example of a process for newly forming the table shown in FIG. 12 will be described with reference to the flow chart shown in FIG. 11.

First, in step S41, a user designates the model of the survey of the partial ruled table indicated in FIG. 4 by the partial ruled table survey model selecting unit 4. This designation may be performed by using the parameters and the like supplied by the partial ruled table survey model selecting unit 4. Subsequently, the number of rows N1 and the number of columns N2 are designated to 2 and 1 respectively by the parameter designating unit 3.

In step S42, an input frame is represented on the display, which is determined based on the model of the survey of the partial ruled table selected in step S41, and the designated parameters such as the number of rows and the number of columns. Then, in step S43, the user enters the content of the item into the input frame displayed in step S42, to produce a partial table. An example of the representation and the input made at this time is shown in FIG. 6. A partial table file for storing the produced partial table is formed, and the partial table thus formed is stored in the partial table retaining unit of the partial table file.

In step S44, a judgement is made as to whether or not all of the item contents about the table to be formed have been entered. At this time, since only a left half portion of the table shown in FIG. 12 has been formed, and a right half portion thereof is not inputted, the process operation is returned to step S41 in which the inputs of the partial table are further continued.

In step S41, the model of the survey for the partial ruled table shown in FIG. 5 is selected, and the parameters N3, N4 and N5 are designated to 1, 2 and 2 respectively. An input frame determined by the selected model as well as parameter is displayed in step S42. In step S43, the item content is inputted into the displayed input frame as shown in FIG. 7. The inputs of all of the item contents are completed up to step S43, and thereafter the process operation is advanced to step S45.

In step S45, a definition is made by the user with employment of the partial table relationship information definition unit 7 that to the partial table formed in the previous step, namely adjacent to the right-sided partial table of FIG. 6, the partial table defined in the later step, namely the partial table shown in FIG. 7 is located. As represented in FIG. 8, the pointer to point out the partial table file 2 for storing therein the partial table shown in FIG. 7 is written into the right-direction-junction pointer retaining unit 23 of the partial table file 1 for storing therein the partial table indicated in FIG. 6.

In step S46, when all of the relationship information has been designated, a table synthesization is performed by the synthesizing unit 11 with reference to the partial table file 1 and the partial table file 2. As a result of such a synthesization, a table as shown in FIG. 12 is produced.

Figure 13:
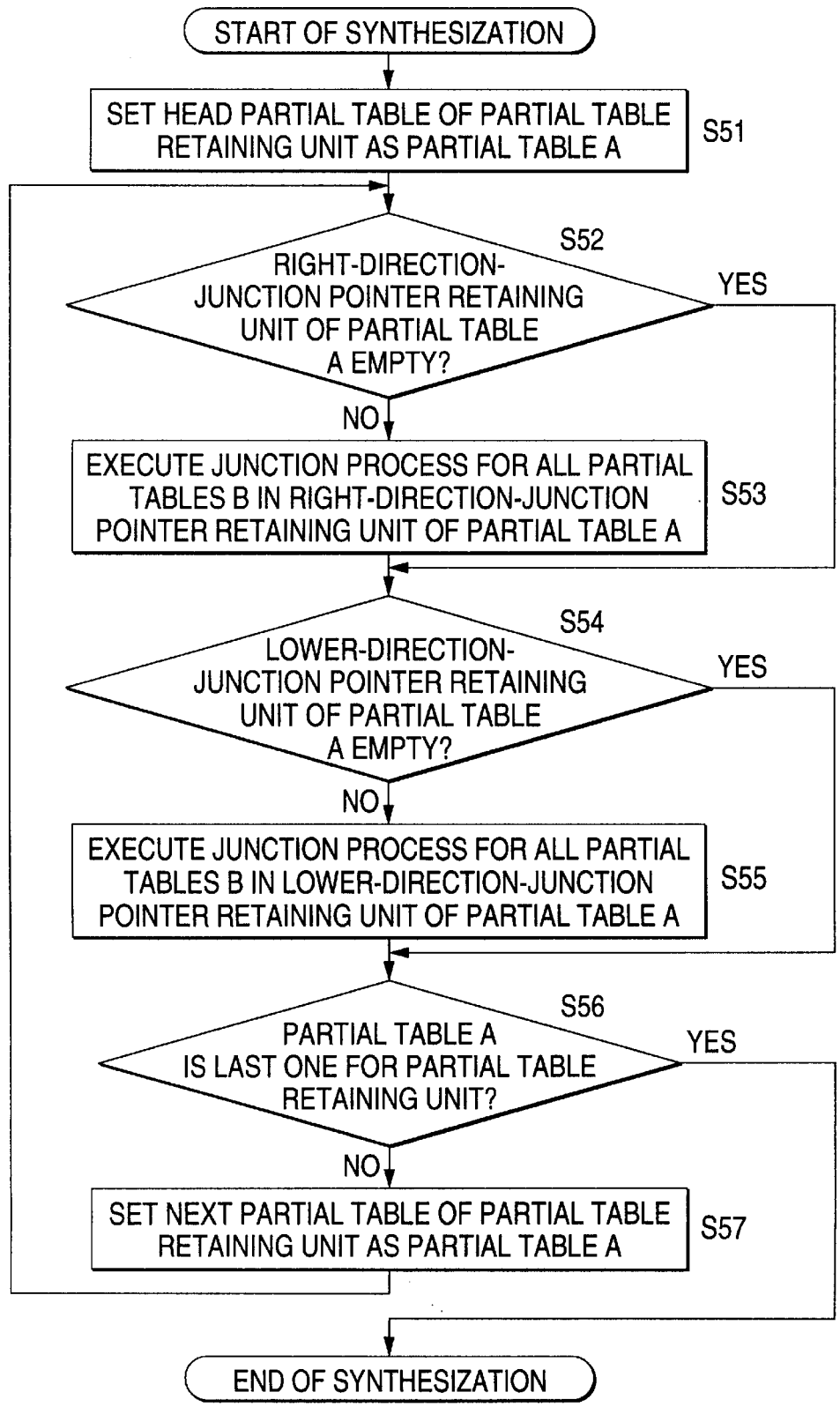
FIG. 13 partially shows a flow chart of an example of the synthesizing process in the first concrete example.
Figure 14:
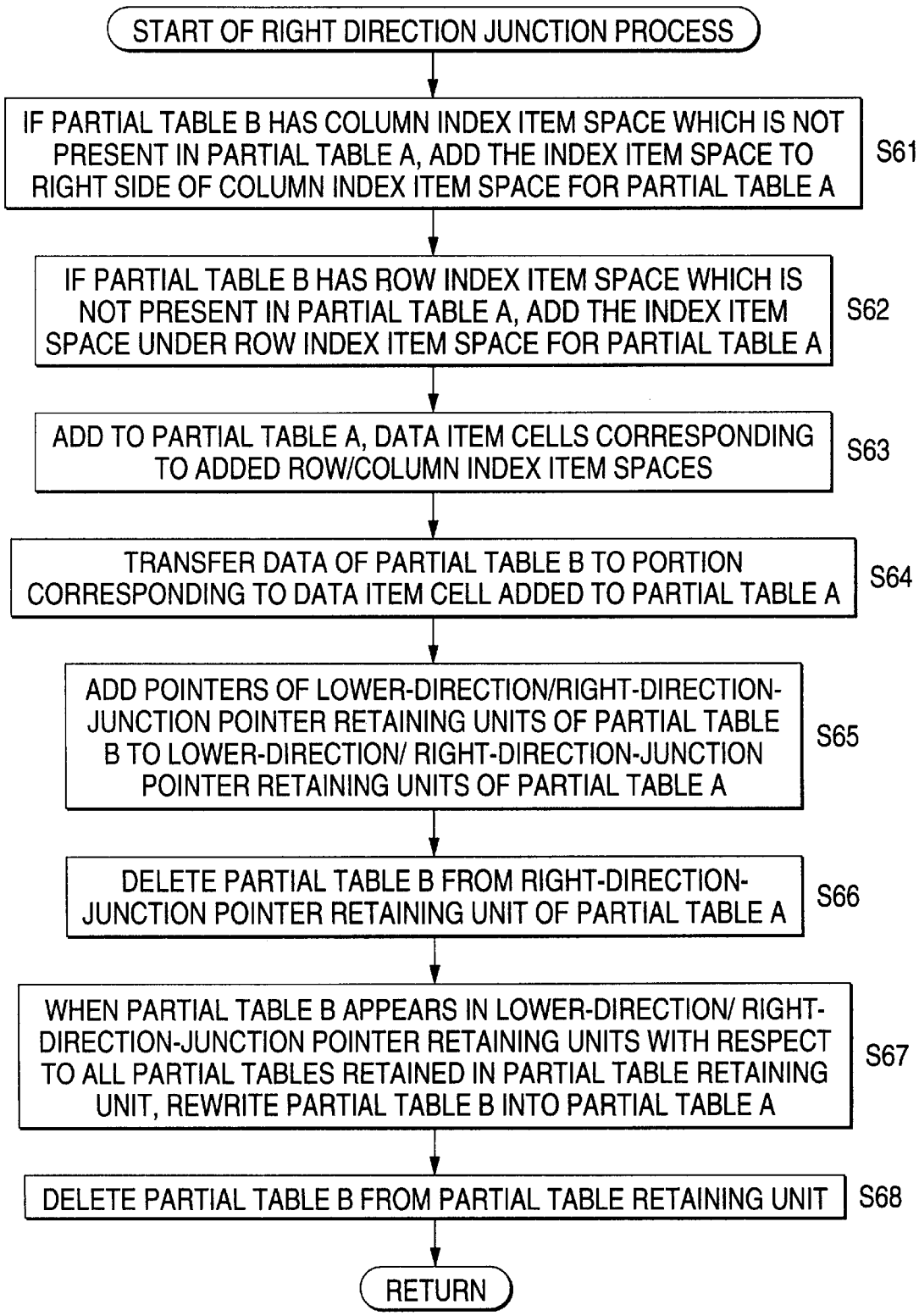
FIG. 14 partially shows the flow chart of the example of the synthesizing process in the first concrete example.
Figure 15:
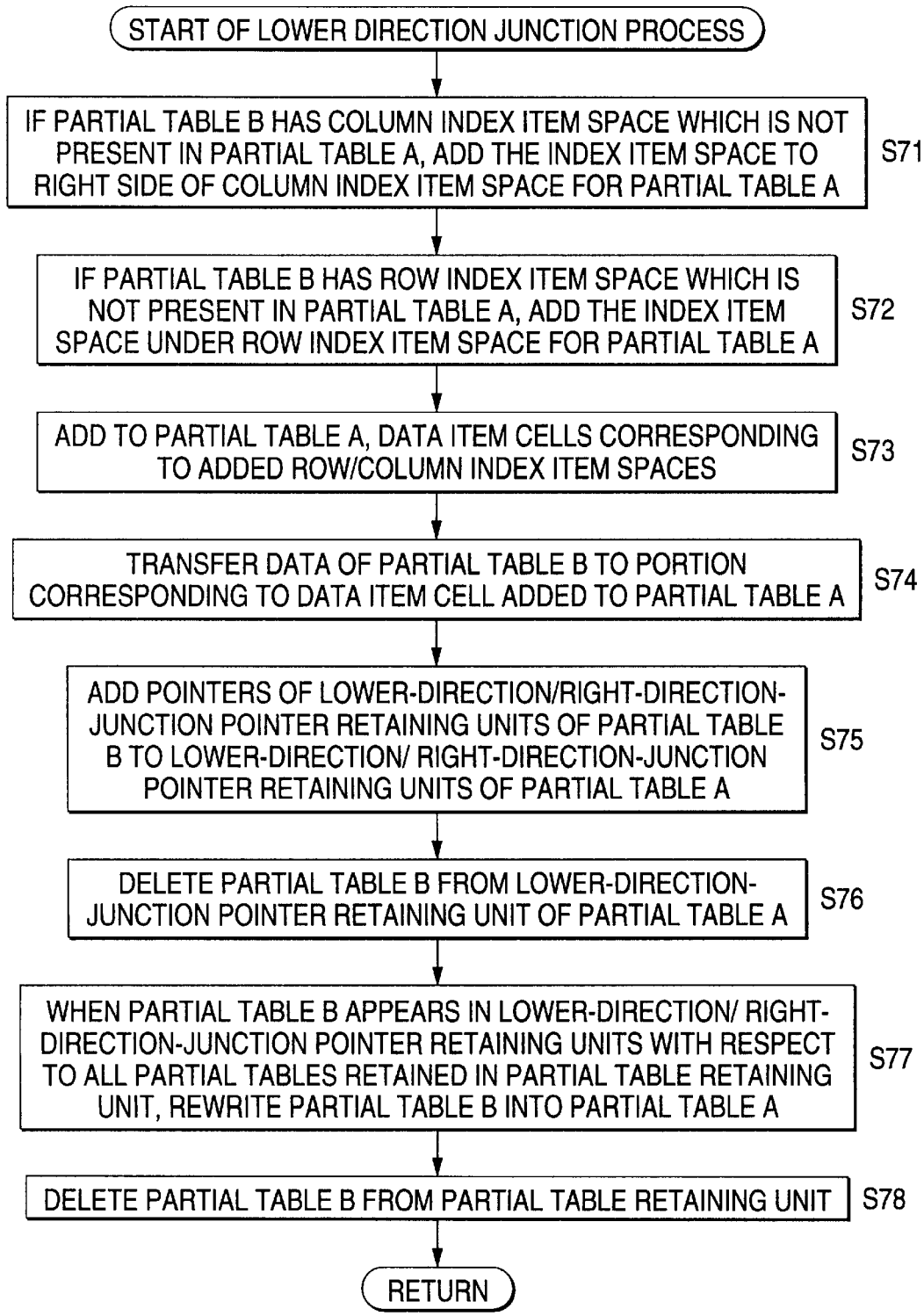
FIG. 15 partially shows the flow chart of the example of the synthesizing process in the first concrete example.

FIG. 13 to FIG. 15 are flow charts for showing an example of the synthesizing process effected in the first concrete example. In step S51, it is now assumed that the head partial table of the partial table retaining unit 6 is a partial table "A". In step S52, a check is done as to whether or the list of the pointer is empty with reference to the right-direction-junction pointer retaining unit 23. If this list is not empty, then a junction process in the right direction as shown in FIG. 14 is executed in step S53 with respect to all of the partial tables B pointed out by the pointer retained in the right-direction-junction pointer retaining unit 23 of the partial table A.

In step S54, another check is made as to whether or not the list of the pointer is empty with reference to the lower-direction-junction pointer retaining unit 22 of the partial table A. If this list is not empty, then a junction process in the lower direction as indicated in FIG. 15 is carried out with regard to all of the partial tables B pointed out by the pointer retained in the lower-direction-junction pointer retaining unit 22 of the partial table A.

In step S56, a judgement is made as to whether or not the partial table A is the last partial table retained in the partial table retaining unit 6. If this partial table does not correspond to the last partial list, then the next partial table retained in the partial table retaining unit 6 is recognized as the partial table A in step S57, and the process operation is returned to step S52 in which the junction process is executed. When the junction process has been carried out with respect to the last partial table, this synthesizing process is ended.

In step S61 of FIG. 14, the junction process in the right direction in step S53 is performed in such a manner that if there is no index item in the column index item of the partial table A among the index items listed in the column index item space for the partial table B, an index item is newly added to the right portion of the column index item space for the partial table A. Similarly, in step S62, if there is no row index item in the row index item for the partial table A among the row index items for the partial table B, then an index item is newly added to a portion under the row index item space for the partial table A. Furthermore, data item cells corresponding to the added column index item cell and the added row index item cell are added to the partial table A in step S63. In step S64, the data about the partial table B is transferred to the portions corresponding to the added data item cells. Thus, the junction process of the partial table retaining unit 21 is completed.

In step S65, the pointers retained in the lower-direction-junction pointer retaining unit 22 and the right-direction-junction pointer retaining unit 23 for the partial table B are newly added to the lower-direction-junction pointer retaining unit 22 and the right-direction-junction pointer retaining unit 23 for the partial table A. In step S66, the pointer for the partial table B is deleted from the right-direction-junction pointer retaining unit 23 for the partial table A. In step S67, if with respect to all of the partial tables retained in the partial table retaining unit 6, the pointer for the partial table B is retained in the lower-direction-junction pointer retaining unit 22 and the right-direction-junction pointer retaining unit 23, then this point is rewritten as the pointer for the partial table A. Finally, in step S68, the partial table B is deleted from the partial table retaining unit 6. With such a process, the partial table B is jointed to the partial table A, thereby forming a single partial table A.

A junction process, as shown in FIG. 15, in the lower direction executed in step S55 is substantially the same as the junction process in the right direction, and there is only a difference that the pointer for the partial table B is deleted from the lower-direction-junction pointer retaining unit 22 of the partial table A.

Description will now be made of a second concrete example as to the table forming apparatus according to the embodiment of the present invention. In the below-mentioned second concrete example, the same table as that formed in the first concrete example is formed in accordance with a different process sequence and a different arrangement.

Figure 16:
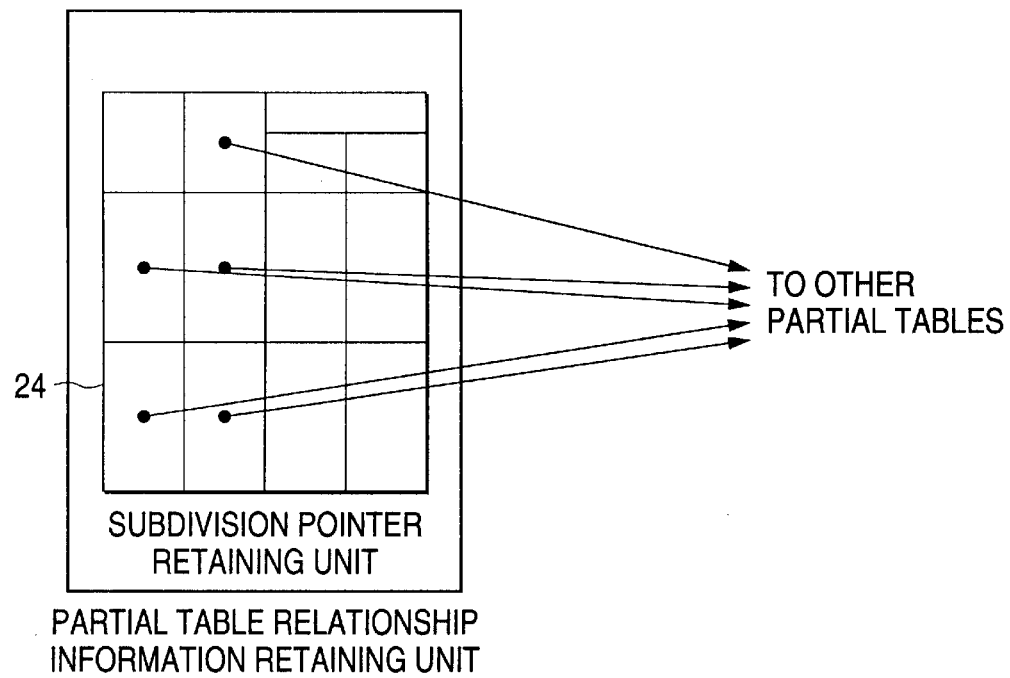
FIG. 16 is an explanatory diagram of the example of a partial table file in a second concrete example.

In this second concrete example, a partial table file is arranged by a partial table retaining unit and a partial table relationship information retaining unit, which are similar to those of the first concrete example. This partial table relationship information retaining unit is constructed of a subdivision pointer retaining unit instead of the lower-direction-junction pointer retaining unit 22 and the right-direction-junction pointer retaining unit 23 employed in the first concrete example. FIG. 16 is an explanatory diagram showing an example of a partial table file in the second concrete example. In FIG. 16, reference numeral 24 designates a subdivision pointer retaining unit. Only the partial table relationship information retaining unit is indicated in FIG. 16. A set of subdivision pointers is stored in the subdivision pointer retaining unit 24. Each of these subdivision pointers is so constructed that an item cell within this partial table is a starting point, and a rectangular region formed by item cells of other partial tables is an ending point. In a single partial table file, it is assumed that a subdivision pointer continuously points out a rectangular region within the same partial table. The rectangular region may be arranged by a single item cell.

Figure 17:
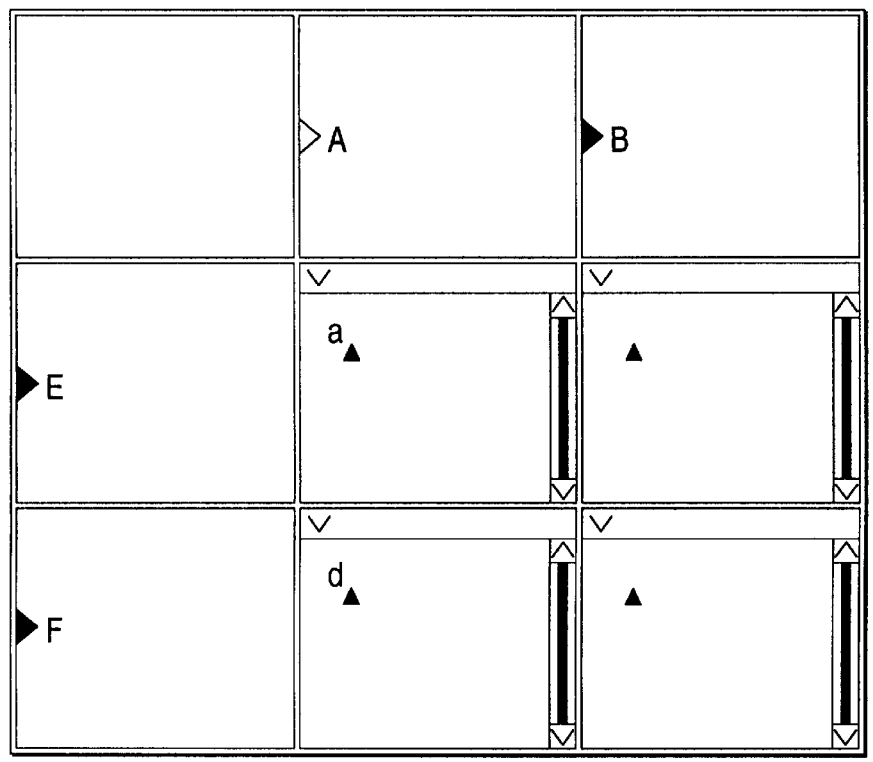
FIG. 17 is an explanatory diagram of an example of a designation of a region to be subdivided.

A designation of subdividing a partial table is carried out by the subdivision designating unit 9. In the subdivision designating unit 9, a partial region of the partial table which is now inputted by the user is designated. The partial region is carried out by selecting the column index item cell and the row index item cell of this partial table. FIG. 17 is an explanatory diagram showing an example of a designation of a subdivision region. In FIG. 17, a column index item "B", and a row index items "E" and "F" are selected, and the selected index items are indicated by bold characters and triangle marks facing to the horizontal direction. With respect to the actual representation on the display, for instance, another method may be realized that the selected index items are displayed in a highlight mode, in a reverse mode, or in a different color display mode. A partial region to be subdivided belongs to the same column as the designated column index item cell, and corresponds to an item cell belonging to the same row as the designated row index item cell. In FIG. 17, this partial region to be subdivided is represented by overlapping the column of the column index item "B" with the rows of the row index items "E" and "F", and corresponds to such a partial region that two item cells in the right half of the table into which data have not yet been inputted, are subdivided.

Once the subdivision is designated, a decision is made of a survey of a partial ruled table for a partial region which will be subdivided. That is, one model of a survey of a ruled table to be used is selected from a plurality of models retained in the partial ruled table survey model retaining unit 2 with employment of the partial ruled table survey model selecting unit 4. At this time, the values of the parameters and the contents of the index items which are intentionally determined from the partial table to be subdivided, are automatically set by the subdivision designating unit 9.

Figure 18:
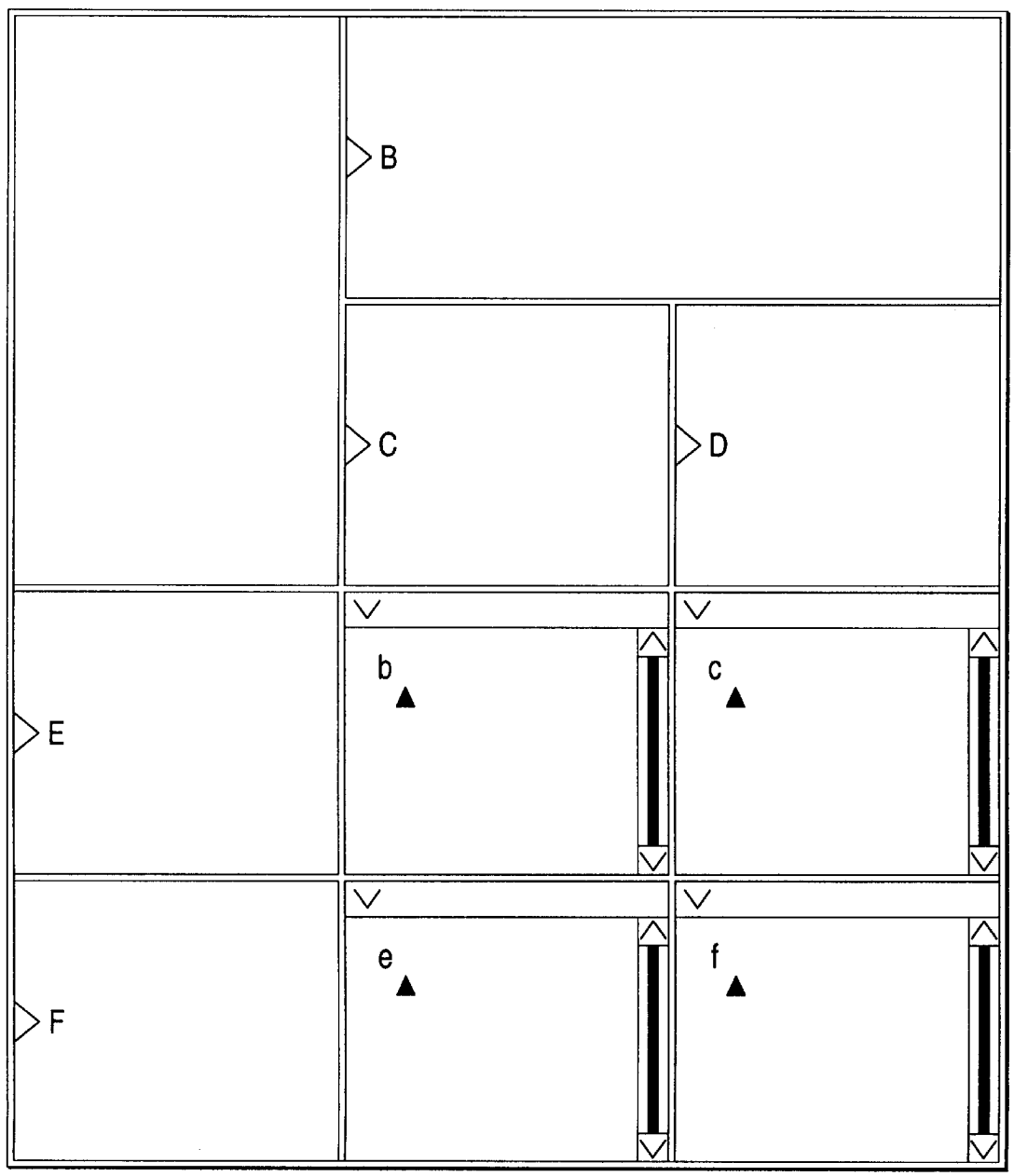
FIG. 18 is an explanatory diagram of an example for inputting the subdivided partial regions.

FIG. 18 is an explanatory diagram for explaining an example to input a subdivided partial region. For instance, FIG. 18 represents that the partial region designated in FIG. 17 is subdivided with employment of the model for the survey of the partial table shown in FIG. 5. The parameters N3 and N5 are automatically set to 1 and 2, respectively. The column index item "B", and the row index items "E" and "F" are automatically inputted. As a consequence, the user can obtain the ruled table of FIG. 18 by designating 2 as the parameter N4. Both the column child index items and the data items are entered into the obtained ruled table.

Figure 19:
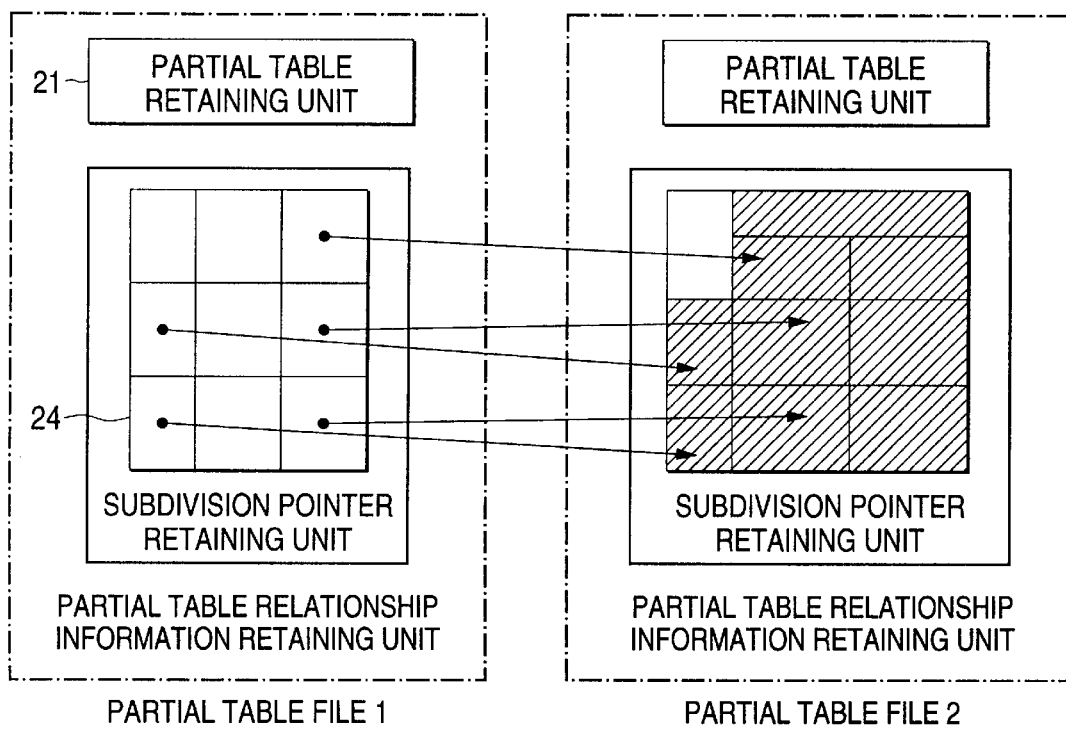
FIG. 19 is an explanatory diagram representing a condition of a subdividing pointer when a designation is made of subdivision.

FIG. 19 is an explanatory diagram showing a condition of a subdivision pointer when a subdivision is designated. As previously stated, when the subdivided ruled table as shown in FIG. 18 is formed from the condition indicated from FIG. 17, the subdivision pointer as represented in FIG. 19 is set to the subdivision pointer retaining unit 24 of the partial table file. In other words, the pointer to the column index item "B" designated during designation of the subdivision points out a column index region of the subdivided partial table, whereas pointers to two row index items point out row index items of the subdivided partial tables. The pointers of the respective item cells for data spaces specified by the designated column index and the designated row index, point out a region consisting of two adjacent item cells in the horizontal direction.

When two partial tables connected by a subdivision pointer with each other are synthesized, the synthesizing unit 11 executes a process in accordance with the following procedure. First, the item cells connected by the subdivision pointer are subdivided by the rued lines, and the subdivided item cells are similar to the rectangular region subdivided by the ruled lines, which is designated by the pointer. For example, when the rectangular region is constructed by two adjoining item cells in the horizontal direction, the item cells corresponding to the starting point of the pointer is subdivided into two item cells by drawing the ruled lines in the vertical direction. Subsequently, the content of the item which is described in the corresponding item cell within the rectangular region designated by the pointer, is transferred to the resultant subdivided item cell. At this time, when the content of the item has been given to the item cell which has not yet been subdivided, this content of the item is discarded, and a new item content is employed.

Figure 20:
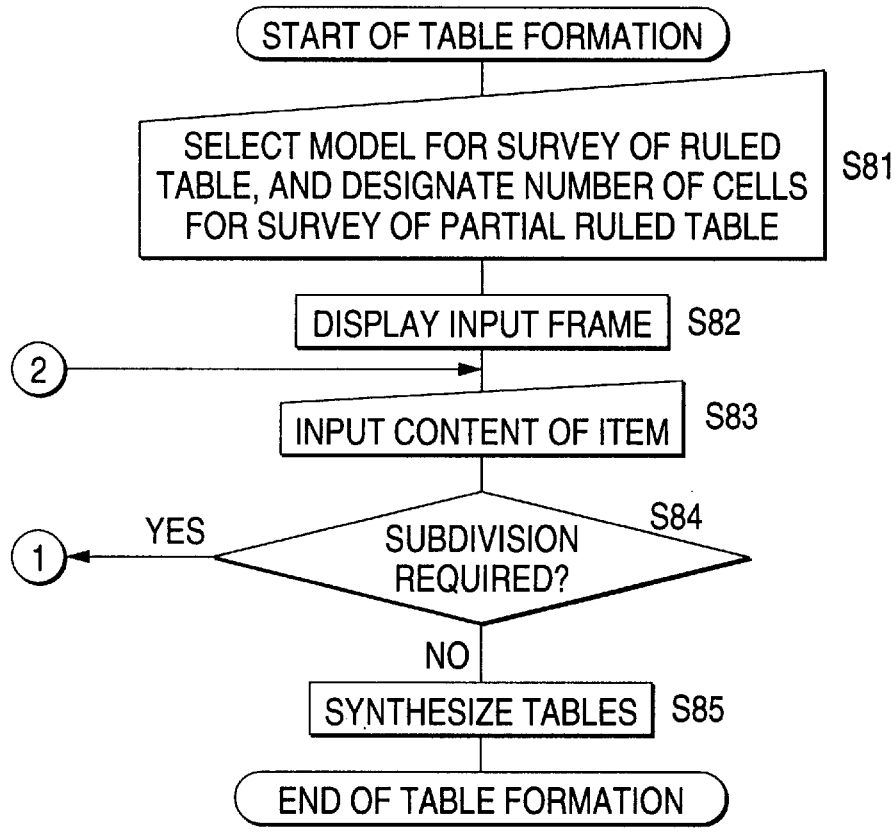
FIG. 20 partially shows a flow chart for explaining the operation of the second concrete example in the table forming apparatus according to the embodiment of the present invention.
Figure 21:
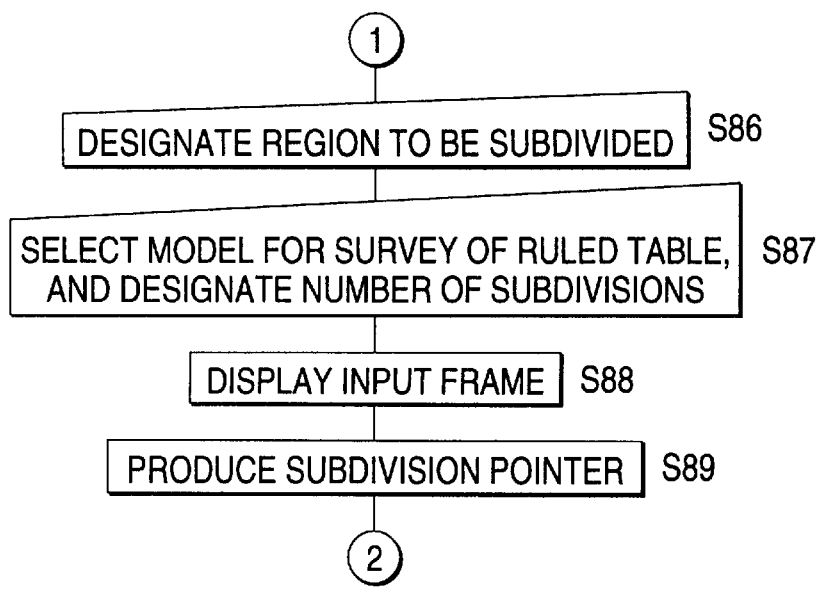
FIG. 21 partially indicates the flow chart for explaining the operation of the second concrete example in the table forming apparatus according to the embodiment of the present invention.

FIGS. 20 and 21 are flow charts for explaining the operation of the second concrete example in the table forming apparatus according to the embodiment of the present invention. In this case, a process operation when the table shown in FIG. 12 is newly formed with employment of the subdivisions will be explained.

First, in step S81, a model of a survey of a partial ruled table is selected based upon a menu and the like provided by the partial ruled table survey model selecting unit 4. The parameters are designated by the parameter designating unit 3. In this case, the model of the survey of the partial ruled table shown in FIG. 4 is designated by the user. At this time, the parameters of the row number N1 and the column number N2 are designated to 2 and 2, respectively. In step S82, in response to these designations, an input frame having these designated row number and column number is shown on the display based upon the selected model of the partial ruled table. In step S83, the user enters the content of the item by utilizing the partial table input unit into the displayed input frame.

In step S84, a judgement is made whether or not a subdivision is carried out. In this case, as shown in FIG. 7, a subdivision region is designated by the subdivision designating unit 9 in order to produce such a new partial table that a right half portion of this partial table has been subdivided. When the subdivision is performed, a region to be subdivided is designated in step S86 shown in FIG. 21. In FIG. 17, the column index item "B", and the row index items "E" and "F" are designated, thereby setting the subdivision region. In step S87, a model for a survey of a partial ruled table employed in the subdivision region is selected. In this case, the user designates the model for the survey of the partial ruled line shown in FIG. 5. At this time, both the column index item "B" and the row index items "E" and "F" are automatically entered, so that the row number and the column number of this survey of the partial ruled table are determined. Also, the user designates the number of subdivisions for each data item cell. In this example, each data item cell is subdivided into two subcells. In step S88, the input frame of the subdivided region is indicated on the display. Then, in step S89, a subdivision pointer is produced by way of the subdivision designating unit 9. That is, as shown in FIG. 19, the subdivision pointer to the corresponding rectangular region within the newly formed partial table is formed from each of the respective subdivided item cells, and then is written into the subdivision pointer retaining unit 24 of the partial table file. Thereafter the process operation is returned to step S83 in which the content of the item is inputted. Here, the content of the item is entered into the input frame obtained by this subdivision, as shown in FIG. 18.

In step S84, it is determined whether or not all of these item contents are inputted and no further subdivision is carried out. If YES, then the process operation is advanced to step S85, in which a table synthesization is performed. As a result, the table shown in FIG. 12 can be produced.

Figure 22:
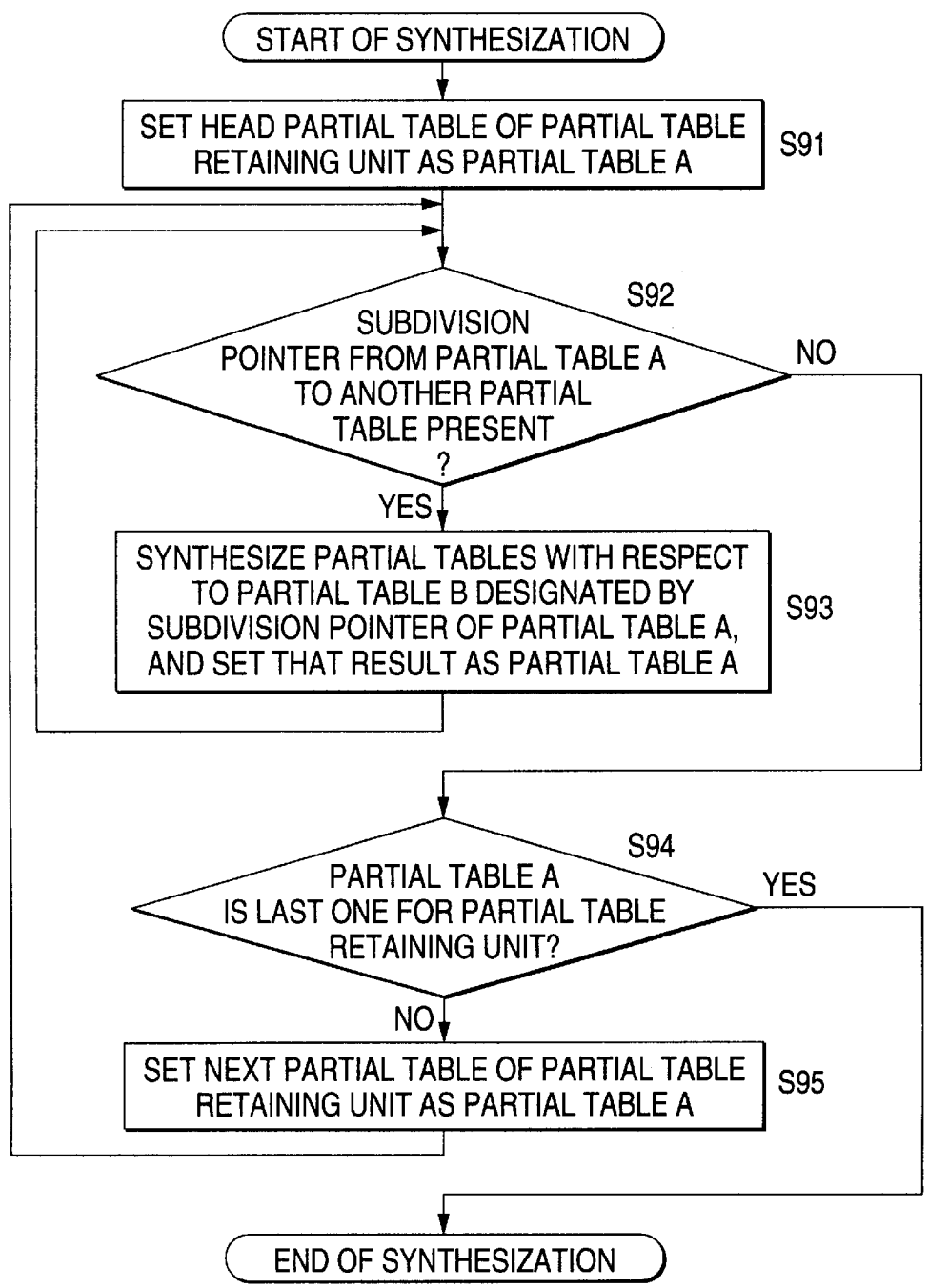
FIG. 22 partially represents a flow chart for explaining an example of a synthesizing process in the second concrete example.
Figure 23:
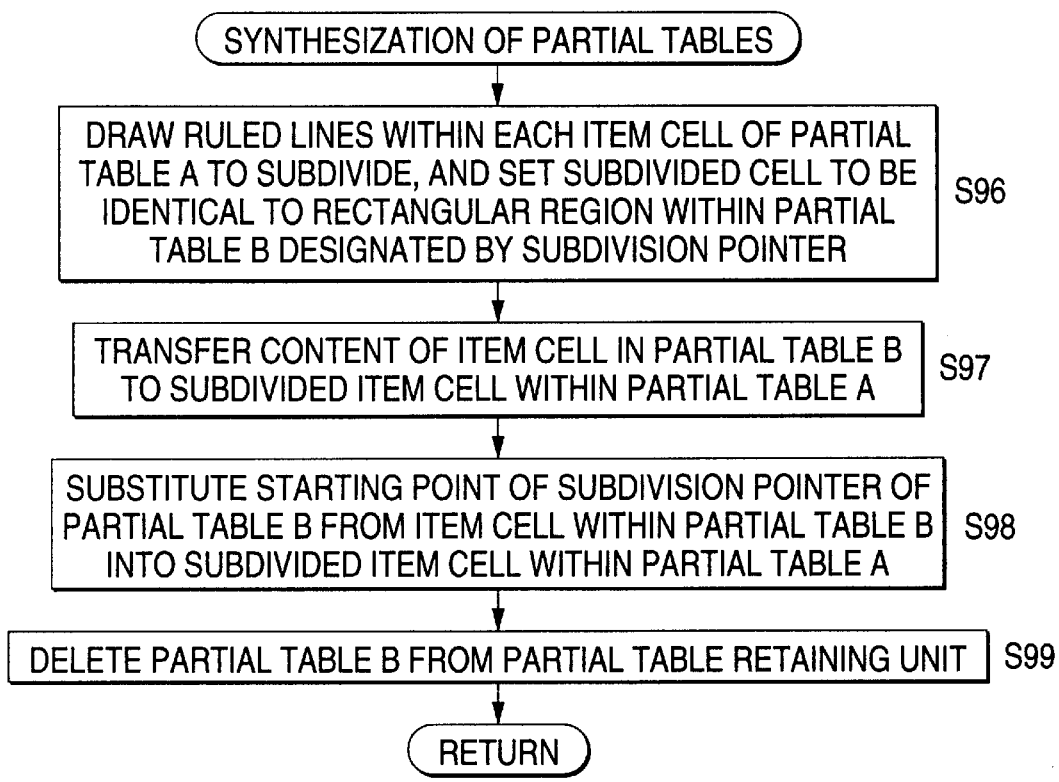
FIG. 23 partially represents the flow chart for explaining the example of the synthesizing process in the second concrete example.

FIGS. 22 and 23 are flow charts for indicating an example of the synthesizing process in the second concrete example. In step S91, a head partial table is derived from the partial tables retained in the partial table retaining unit 6 and then used as a partial table "A". In step S92, a judgement is made whether or not a subdivision pointer from the partial table A to another partial table is present. If there is a subdivision pointer, then the formation of a partial table as shown in FIG. 23 is carried out in step S93 with respect to all of the partial tables "B" which are designated by the subdivision pointer for the partial table A, and thus the synthesized table is set as a partial table A. In the synthesization of the partial table shown in FIG. 23, when the subdivision pointers have further been attached to the partial table B to the partial table C, this subdivision pointer is substituted by another subdivision pointer used from the partial table B to the partial table C. As a consequence, even when the process in step S93 is completed, since there are certain possibilities that a subdivision pointer used from the partial table A to another partial table is present, another check is done in step S92. In step S94, a check is made whether or not the partial table A corresponds to the last partial table retained in the partial table retaining unit 6. If this partial table A is not the last partial table, then the succeeding table retained in the partial table retaining unit 6 is used as the partial table A. Then, the process operation is returned to step S92, so that the process operation is continued. When the process for the last partial process is ended, the synthesization process is accomplished.

The formation of the partial table defined in step S93 is carried out as follows: In step S96 of FIG. 23, a ruled line is drawn in the item cell where there is the starting point of the subdivision pointer for the partial table A so as to subdivide it. This subdivided item cell is identical to the rectangular region within the partial table B designated by the subdivision pointer. Next, in step S97, the contents of the respective items of the partial table B are transferred to the corresponding item cells of the partial table A. Furthermore, in step S98, the starting point of the subdivision pointer for the partial table 2 is substituted from the item cell within the partial table 2 into the corresponding item cell within the subdivided partial table 1. As a result of this process, the partial table 2 is synthesized with the partial table 1. Then, in step S99, the partial table B is deleted from the partial table retaining unit 6, and then the formation of the partial tables is ended.

The function of the subdivision employed in the above-explained second concrete example may be simultaneously equipped with the function for forming the subdivided partial tables and synthesizing them with respect to each of the partial tables as previously stated in the first concrete example. The user can readily form even such a complex table by properly utilizing these functions in response to the tables to be formed.

A more complex table may be easily formed by employing the functions as previously mentioned in the first and second concrete examples and also by employing many sorts of models for the surveys of the partial ruled tables. Hereinafter, description will be made of some models for the surveys of the ruled tables stored in the partial ruled table survey model retaining unit 2.

Figure 24:
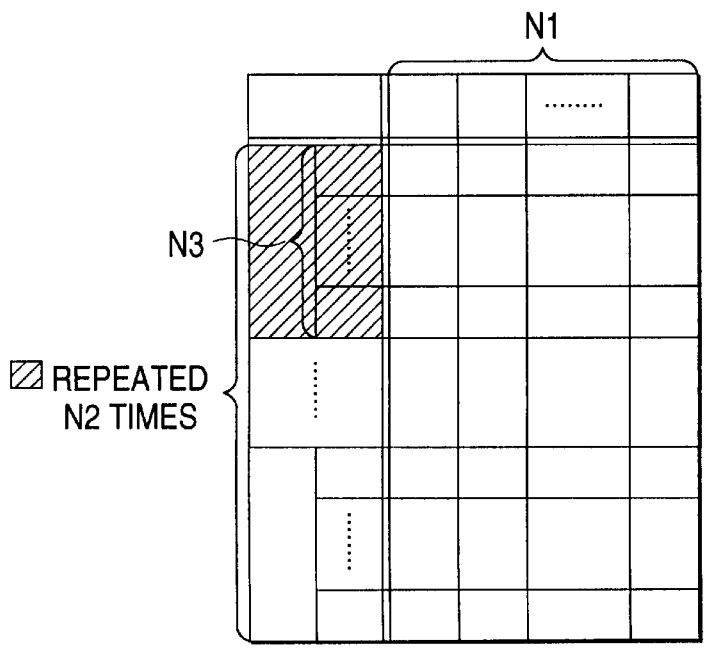
FIG. 24 is an explanatory diagram showing a third model of the survey of the partial ruled table.

FIG. 24 is an explanatory diagram of a third model for a survey of a partial ruled table. In FIG. 24, there is shown a sample of a model for such a survey of a ruled table having a column index space consisting of one layer and a row index space consisting of two layers. As parameters required when a ruled table is determined from this model, there are the number N1 of column index item cells appearing in the column index space, the number N2 of parent row index item cells appearing at the most left column within the row index space, the number N3 of child row index item cells appearing on the right side of a single parent row index item cell, and the like.

Figure 25:
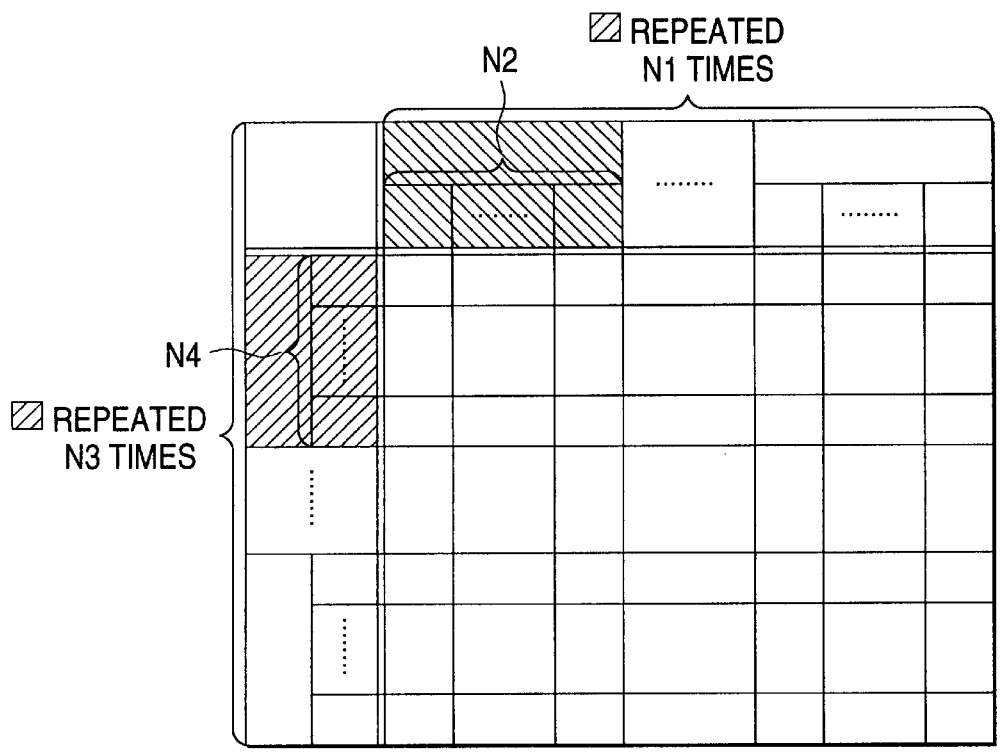
FIG. 25 is an explanatory diagram showing a fourth model of the survey of the partial ruled table.

FIG. 25 is an explanatory diagram of a fourth model for a survey of a partial ruled table. In this case of FIG. 25, the number of layers of the column index space and row index space are selected to be commonly 2. As parameters required to determine a ruled table from this further model, there are the number N1 of parent column index item cells appearing in the column index space, the number N2 of child column index item cells appearing under a single parent column index item cell, the number N3 of parent row index item cells appearing in the row index space, the number N3 of child row index item cells appearing on the right side of a single parent row index item cell, and the like.

It is also possible to employ, if necessary, such a partial table input unit that the numbers of layers of the column index space and row index space are selected to be arbitrary values. In this case, as parameters to be designated, there are the number MH of layers of the column index space, the number MV of layers of the row index space, the number NHi (i=1 to MH) of index item cells provided at an i-th layer of the column index space, and the number NVj (j=1 to MV) of index item cells provided at a j-th layer of the row index space.

Figure 26:
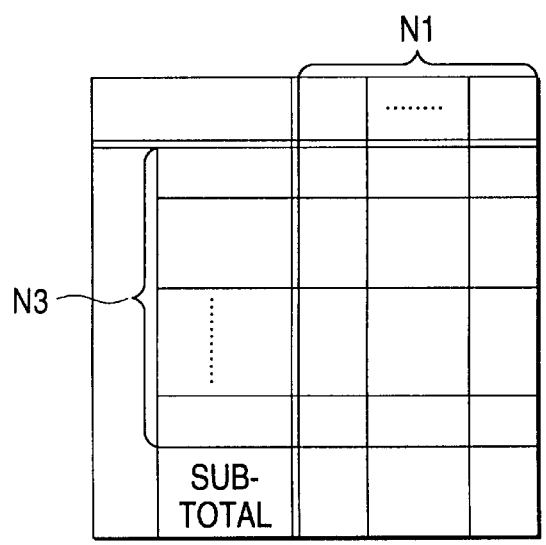
FIG. 26 is an explanatory diagram showing a fifth model of the survey of the partial ruled table.

FIG. 26 is an explanatory diagram of a fifth model of a survey of a partial ruled table. In this example of FIG. 26, there is shown a model for a survey of a ruled table having a "sub-total" space. FIG. 27 is an explanatory diagram showing another table to be formed. The table as indicated in FIG. 27 may be formed in such a manner that a partial table of a row index "1990" and a partial table of a column index "1991" are formed by employing the model shown in FIG. 26, and furthermore a partial table of a row index "total" is formed by utilizing the model shown in FIG. 4, and finally, these partial tables are synthesized with each other.

As previously stated, since many sorts of models have been retained in the partial ruled table survey model retaining unit 2, these modes can be applied to the inputs of various tables. Also, workloads of the user to form the tables may be reduced.

FIG. 28 is an explanatory diagram for indicating such an example where a partial table is added. The partial table of a row index "1992" is produced to the three partial tables employed in FIG. 27, whereby the designations about the adjacent partial tables are varied by the adjacency designating unit 9. As a result, the partial table of the row index "1992" is added to the table shown in FIG. 27, so that a new table can be formed. In this way, the table may be added by only forming the new partial table and changing the relationship information between the partial tables. Accordingly, the overall table operation can become easy, and the previously formed tables may be reused.

As apparent from the foregoing descriptions, according to the present invention, the partial ruled table having the simple shape is automatically produced by designating some parameters, the items are inputted into this partial ruled table by the user to form the partial table, and also a desirable table is finally produced by synthesizing these formed partial tables. Even such a complex table may be formed with executing only a simple operation, so that the user can be released from the cumbersome operations to form the ruled tables. At this time, the user may commence his inputting operations from such a portion in which a relationship between index items and data is partially clear, namely, a portion whose survey of a ruled table is simple, without previously determining a survey of an entire ruled table. As a consequence, the workloads given to the user can be reduced. Since no longer such a cumbersome table forming work is required, there is another merit that an easy modification occurring in the table forming operation may be achieved.

Furthermore, a formed partial table may be utilized to form another table as a portion, and therefore a portion of the previously formed table may be reused, resulting in reductions of the table forming workload. A large-sized table may be properly subdivided into the subdivided table portions which will then be entered by a plurality of users so as to form a desirable table by combining these subdivided table portions with each other. As a consequence, the efficiency of this table forming work can be increased. When the large-sized table is inputted with the above-described subdivisions, the table forming work may be carried out while the user confirms the relationships between the index items and the data on the display, so that there is another advantage to reduce the inputting errors during the table forming operation.

What is claimed is:

1. A table forming apparatus comprising:
   partial ruled table survey forming means for forming a survey of a partial ruled table, the survey representing a relative positional relationship between ruled lines, and wherein the partial ruled table includes a row index item cell, a column index item cell, and an data item cell;
   partial table input means for inputting a content of one of the item cells of the survey of the partial ruled table, the item cells being blocks enclosed by the ruled lines;
   partial table relationship information defining means for defining a relationship between multiple partial tables formed by successive operations of said partial table input means; and
   synthesizing means for synthesizing the multiple partial tables to form a desired table based on both information about each multiple partial table completed by said partial table input means and information about the relationship between the multiple partial tables defined by said partial table relationship information defining means.

2. The table forming apparatus as claimed in claim 1, wherein said partial ruled table survey forming means comprises partial ruled table survey model retaining means for retaining a model of the survey of the ruled table, and parameter designating means for designating a parameter employed in connection with the model of the survey of the ruled table.

3. The table forming apparatus as claimed in claim 2, wherein said partial ruled table survey model retaining means retains a plurality of models for the survey of the ruled table, and said partial ruled table survey forming means further comprises partial ruled table survey model selecting means for selecting a model of the survey of the ruled table.

4. The table forming apparatus as claimed in claim 1, wherein said partial table relationship information defining means contains either positional information between the multiple partial tables, or positional information about a position of each partial table within an overall table as the information about the relationship between the multiple partial tables.

5. The table forming apparatus as claimed in claim 4, wherein said partial table relationship information defining means comprises adjacency designating means for designating such positional information that a plurality of partial tables are located adjacent to each other.

6. The table forming apparatus as claimed in claim 4, wherein said partial table relationship information defining means comprises subdivision designating means for designating a production of a survey of a ruled table in which all or a portion of the multiple partial tables are subdivided.

7. A table forming apparatus comprising:
   partial ruled table survey forming means for forming surveys of a plurality of partial ruled tables including a row index item cell for inputting a row index item, a column index item cell for inputting a column index item, and a data item cell for inputting element data corresponding to the row and column index items;
   partial table input means for displaying the surveys of the plurality of partial ruled tables formed by said partial ruled table survey forming means and receiving from a user contents for the row index item cell, column index item cell and data item cell as displayed to form a plurality of partial tables;
   partial table relationship information retaining means for retaining a positional adjacent relationship in a row direction of the plurality of partial tables formed by said partial table input means to define a positional relationship between adjacent partial tables; and
   synthesizing means for synthesizing the plurality of partial tables to form a table larger than any of the partial tables based on the positional adjacent relationship in the row direction of the plurality of partial tables retained by said partial table relationship information retaining means,
   wherein said synthesizing means compares a first partial table of the plurality of partial tables with a second partial table of the plurality of the partial tables adjacent to the first partial table in the row direction for each row index item and each column index item in accordance with the positional adjacent relationship in the row direction of the plurality of partial tables retained by said partial table relationship information retaining means, adds a row index item of the second partial table which is not included in the row index items of the first partial table and a column index item of the second partial table which is not included in the column index items of the first partial table, as a row index item and a column index item of the first partial table, respectively, and adds to the first partial table a data item corresponding to the row and column index items added to the first partial table.

8. The table forming apparatus as claimed in claim 7, wherein said partial ruled table survey forming means forms surveys of the plurality of partial ruled tables including at least one survey of a ruled table having a plurality of index item cells in at least one of a single row and a single column of the ruled table.

9. A table forming apparatus comprising:

partial ruled table survey forming means for forming surveys of a plurality of partial ruled tables including a row index item cell for inputting a row index item, a column index item cell for inputting a column index items, and a data item cell for inputting element data corresponding to the row and column index items;

partial table input means for displaying the surveys of the plurality of partial ruled tables formed by said partial ruled table survey forming means and receiving from a user contents for the row index items cell, column index item cell and data item cell as displayed to form a plurality of partial tables;

partial table relationship information retaining means for retaining a positional adjacent relationship in a column direction of the plurality of partial tables formed by said partial table input means to define a positional relationship between adjacent partial tables; and synthesizing means for synthesizing the plurality of partial tables to form a table larger than any of the partial tables based on the positional adjacent relationship in the column direction of the plurality of partial tables retained by said partial table relationship information retaining means, wherein said synthesizing means compares a first partial table of the plurality of partial tables with a second partial table of the plurality of partial tables adjacent to the first partial table in the row direction for each row index item and each column index item in accordance with the positional adjacent relationship in the column direction of the plurality of partial tables retained by said partial table relationship information retaining means, adds a row index item of the second partial table which is not included in the row index items of the first partial table and a column index item of the second partial table which is not included in the column index items of the first partial table, as a row index item and a column index item of the first partial table, respectively, and adds to the first partial table a data item corresponding to the row and column index items added to the first partial table.

10. The table forming apparatus as claimed in claim 9, wherein said partial ruled table survey forming means forms surveys of the plurality of partial ruled tables including at least one survey of a ruled table having a plurality of index item cells in at least one of a single row and a single column of the ruled table.

11. A table forming apparatus comprising:

partial ruled table survey forming means for forming a survey of a first partial ruled table including a row index item cell for inputting a row index item, a column index item cell for inputting a column index item, and a data item cell for inputting element data corresponding to the row and column index items, and for forming a survey of a second partial ruled table including a row index item cell for inputting a row index item, a column index item cell for inputting a column index item, and a data item cell for inputting element data corresponding to the row and column index items, and including a plurality of index item cells in at least one of a single row and a single column of the second ruled table;

partial table input means for displaying the surveys of the first and second ruled tables formed by said partial ruled table survey forming means and receiving from a user contents for the row index item cell, column index cell and data item cell as displayed to form a plurality of partial tables;

partial table relationship information retaining means for retaining a subdivision relationship between the first and second partial tables to allow at least one row index item, at least one column index item and at least one data item cell corresponding to the row and column index items of the first partial table to respectively correspond to at least one row index item, at least column index item and at least one data item cell corresponding to the row and column index items of the second partial table; and synthesizing means for subdividing the row index item, column index item and data item cell corresponding to the row and column index items of the first partial table that have the subdivision relationship to the second partial table so as to have the same shapes as the row index items, column index item and data item cell corresponding to the row and column index items of the second partial table, respectively, based on the subdivision relationship between the first and second partial tables retained by said partial table relationship information retaining means, wherein, in the subdivision relationship between the first and second partial tables retained by said partial table relationship information retaining means, a plurality of row index items included in a single row or a plurality of column index items included in a single column of the second partial table correspond to at least one of the row index items and the column index items of the first partial table.

* * * * *

UNITED STATES PATENT AND TRADEMARK OFFICE
CERTIFICATE OF CORRECTION

PATENT NO. : 5,835,917
DATED : November 10, 1998
INVENTOR(S) : SHIN et al.

It is certified that error appears in the above-identified patent and that said Letters Patent is hereby corrected as shown below:

Claim 1, column 17, line 61, "an data" should read --a data--.

Claim 9, column 19, line 27, "items" should read --item--.

Claim 11, column 20, line 37, before "column", insert --one--.

Signed and Sealed this

Twenty-second Day of June, 1999

Attest:

Q. TODD DICKINSON

*Attesting Officer*   Acting Commissioner of Patents and Trademarks